US008732758B2

(12) United States Patent
Boyer et al.

(10) Patent No.: US 8,732,758 B2
(45) Date of Patent: May 20, 2014

(54) TELEVISION SYSTEM WITH AIDED USER PROGRAM SEARCHING

(75) Inventors: Franklin E. Boyer, Cleveland, OH (US); Timothy B. Demers, Tulsa, OK (US)

(73) Assignee: United Video Properties, Inc., Santa Clara, CA (US)

( * ) Notice: Subject to any disclaimer, the term of this patent is extended or adjusted under 35 U.S.C. 154(b) by 261 days.

(21) Appl. No.: 12/273,277

(22) Filed: Nov. 18, 2008

(65) Prior Publication Data

US 2009/0077589 A1    Mar. 19, 2009

Related U.S. Application Data

(63) Continuation of application No. 09/330,793, filed on Jun. 11, 1999, now abandoned.

(60) Provisional application No. 60/093,197, filed on Jul. 17, 1998.

(51) Int. Cl.
*H04N 7/173* (2011.01)
*H04N 7/10* (2006.01)
*H04N 7/16* (2011.01)
*G06F 15/00* (2006.01)

(52) U.S. Cl.
USPC .................................. 725/46; 725/9; 725/45

(58) Field of Classification Search
USPC .............................. 725/31, 46, 45, 9; 348/460
See application file for complete search history.

(56) References Cited

U.S. PATENT DOCUMENTS

| | | |
|---|---|---|
| 4,081,753 A | 3/1978 | Miller |
| 4,170,782 A | 10/1979 | Miller |
| 4,271,532 A | 6/1981 | Wine |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,641,205 A | 2/1987 | Beyers, Jr. |
| 4,689,022 A | 8/1987 | Peers et al. |

(Continued)

FOREIGN PATENT DOCUMENTS

| | | |
|---|---|---|
| DE | 4 440 419 | 5/1996 |
| EP | 0 721 253 | 7/1996 |

(Continued)

*Primary Examiner* — Pankaj Kumar
*Assistant Examiner* — Reuben M Brown
(74) *Attorney, Agent, or Firm* — Ropes & Gray LLP

(57) ABSTRACT

A system having an adaptive browse feature and an adaptive flip feature is provided. The adaptative browse and flip features may be selected to receive program viewing suggestions. The system may provide a suggestion by displaying an adaptive browse region or adaptative flip region including a program suggestion. The system identifies programs to suggest based on a user=s viewing activity. The system uses different algorithms that are user-selectable and user-adjustable to identify program suggestions. The system may query a program guide database to build a list of programs having attributes similar to the attributes of the current program or the last viewed program. The system may use an adaptive learning algorithm such as a neural network. The neural network may be trained by the program guide by monitoring user-viewing activity.

Each algorithm may be personalized for multiple users.

28 Claims, 30 Drawing Sheets

(56) References Cited

U.S. PATENT DOCUMENTS

| | | | |
|---|---|---|---|
| 4,706,121 A | 11/1987 | Young | |
| 4,751,578 A | 6/1988 | Reiter et al. | |
| 4,754,326 A | 6/1988 | Kram et al. | |
| 4,908,713 A | 3/1990 | Levine | |
| 4,963,994 A | 10/1990 | Levine | |
| 5,038,211 A | 8/1991 | Hallenbeck | |
| 5,047,867 A | 9/1991 | Strubbe et al. | |
| 5,075,771 A | 12/1991 | Hashimoto | |
| 5,210,611 A | 5/1993 | Yee et al. | |
| 5,223,924 A | 6/1993 | Strubbe | |
| 5,317,403 A | 5/1994 | Keenan | |
| 5,323,240 A | 6/1994 | Amano et al. | |
| 5,410,344 A | 4/1995 | Graves et al. | |
| 5,432,561 A | 7/1995 | Strubbe | |
| 5,444,499 A | 8/1995 | Saitoh | |
| 5,465,113 A | 11/1995 | Gilboy | |
| 5,465,385 A | 11/1995 | Ohga et al. | |
| 5,477,262 A | 12/1995 | Banker et al. | |
| 5,481,296 A | 1/1996 | Cragun et al. | |
| 5,483,278 A | 1/1996 | Strubbe et al. | |
| 5,523,796 A | 6/1996 | Marshall et al. | |
| 5,534,911 A | 7/1996 | Levitan | |
| 5,585,866 A | 12/1996 | Miller et al. | |
| 5,589,892 A | 12/1996 | Knee et al. | |
| 5,600,364 A | 2/1997 | Hendricks et al. | |
| 5,617,565 A | 4/1997 | Augenbraum et al. | |
| 5,621,456 A | 4/1997 | Florin et al. | |
| 5,694,176 A | 12/1997 | Bruette et al. | |
| 5,731,844 A | 3/1998 | Rauch et al. | |
| 5,752,160 A | 5/1998 | Dunn | |
| 5,758,257 A * | 5/1998 | Herz et al. | 725/116 |
| 5,774,357 A | 6/1998 | Hoffberg et al. | |
| 5,798,785 A * | 8/1998 | Hendricks et al. | 725/46 |
| 5,801,747 A | 9/1998 | Bedard | |
| 5,822,123 A | 10/1998 | Davis et al. | |
| 5,848,396 A | 12/1998 | Gerace | |
| 5,867,226 A | 2/1999 | Wehmeyer et al. | |
| 5,875,108 A | 2/1999 | Hoffberg et al. | |
| 5,880,768 A | 3/1999 | Lemmons et al. | |
| 5,903,545 A | 5/1999 | Sabourin et al. | |
| 5,961,603 A * | 10/1999 | Kunkel et al. | 709/229 |
| 5,973,683 A | 10/1999 | Cragun et al. | |
| 5,977,964 A * | 11/1999 | Williams et al. | 715/721 |
| 5,986,650 A | 11/1999 | Ellis et al. | |
| 6,005,597 A | 12/1999 | Barrett et al. | |
| 6,029,195 A | 2/2000 | Herz | |
| 6,075,526 A | 6/2000 | Rothmuller | |
| 6,081,750 A | 6/2000 | Hoffberg et al. | |
| 6,088,722 A | 7/2000 | Herz | |
| 6,133,909 A * | 10/2000 | Schein et al. | 715/721 |
| 6,163,316 A | 12/2000 | Killian | |
| 6,172,674 B1 | 1/2001 | Etheredge | |
| 6,177,931 B1 | 1/2001 | Alexander | |
| 6,181,335 B1 | 1/2001 | Hendricks | |
| 6,216,264 B1 | 4/2001 | Maze et al. | |
| 6,262,721 B1 * | 7/2001 | Tsukidate et al. | 715/721 |
| 6,437,836 B1 | 8/2002 | Huang et al. | |
| 6,505,348 B1 | 1/2003 | Knowles et al. | |
| 2004/0049787 A1 | 3/2004 | Maissel et al. | |
| 2007/0271582 A1 * | 11/2007 | Ellis et al. | 725/46 |
| 2009/0106787 A1 * | 4/2009 | Maissel et al. | 725/9 |

FOREIGN PATENT DOCUMENTS

| | | |
|---|---|---|
| EP | 0 774 866 | 5/1997 |
| EP | 0 854 645 | 7/1998 |
| GB | 1 554 411 | 10/1979 |
| WO | WO 86/01359 | 2/1986 |
| WO | WO 89/03085 | 4/1989 |
| WO | WO 94/13107 | 6/1994 |
| WO | WO 94/14284 | 6/1994 |
| WO | WO 95/15658 | 6/1995 |
| WO | WO 95/28799 | 10/1995 |
| WO | WO 96/17473 | 6/1996 |
| WO | WO 96/41478 | 12/1996 |
| WO | WO 97/48230 | 12/1997 |
| WO | WO 97/49237 | 12/1997 |
| WO | WO 97/49242 | 12/1997 |
| WO | WO 98/26584 | 6/1998 |
| WO | WO 98/43183 | 10/1998 |
| WO | WO 98/48566 | 10/1998 |
| WO | WO 99/01984 | 1/1999 |
| WO | WO 99/14947 | 3/1999 |
| WO | WO 99/45701 | 9/1999 |
| WO | WO 00/04708 | 1/2000 |
| WO | WO 00/05889 | 2/2000 |
| WO | WO 00/28734 | 5/2000 |

* cited by examiner

TELEVISION SYSTEM WITH AIDED USER PROGRAM SEARCHING

This application is a continuation of application Ser. No. 09/330,793, filed Jun. 11, 1999, which claims the benefit of U.S. provisional application No. 60/093,197, filed Jul. 17, 1998.

BACKGROUND OF THE INVENTION

This invention relates to television systems, and more particularly, to television systems such as interactive television program guide systems having aided user program searching.

Cable, satellite, and broadcast television systems provide a large number of television channels.

Typically, the number of channels provided by cable and satellite systems is over a hundred and ever increasing. Television viewers have traditionally consulted printed television program schedules to obtain programming information. More recently, interactive electronic television program guides have been developed to allow television program information to be displayed on viewer television equipment.

Interactive electronic television program guides (Aprogram guides@) typically provide program listings of all channels available in the television system. Some program guides include features for allowing users to scan through channel information or programs in order to select a program to access.

As detailed in Knee et al. U.S. Pat. No. 5,589,892, a program guide may include browse and flip for user program searching. The browse feature presents a browse overlay region on the user=s television screen that contains a program listing. The user may use up and down arrow keys take action from a user input interface device to direct the browse overlay to scan the listings on other channels while remaining tuned to the current channel. This allows the user to browse available program listings without missing any of the program on the current channel. The flip feature presents a flip overlay region on the user=s television screen that contains a program listing. The user may flip through these listings. As the user changes channels, the program listing in the flip display region is updated to match the program on the current channel. With either the browse or flip feature, finding a suitable program for viewing may require scanning through individual program listings for numerous channels. Scanning through such a large number of channels to find a suitable program for viewing may be time-consuming and cumbersome.

It is therefore an object of the present invention to provide a television system that monitors a user=s television viewing activity and suggests programs for the user to view.

Is it also an object of the present invention to provide a television system that displays suggested program listings and that allows the user to browse the suggested program listings using an adaptive browse feature.

It is also a further object of the present invention to provide a television system that displays suggested program listings and that allows the user to flip through the suggested listings using an adaptive flip feature.

SUMMARY OF THE INVENTION

These and other objects of the invention are accomplished in accordance with the principles of the present invention by providing a system that monitors the television viewing of a user. The system determines the user's interests from the user's viewing activities and displays program listings for suggested programs. The user may browse through suggested program listings using an adaptive browse feature or may flip through suggested program listings using an adaptive flip feature.

The system maintains a database of program listings. The database may be maintained on each user's television equipment (e.g., on each user's set-top box), may be maintained on a central server (e.g., at the user's cable system headend) or other suitable platform. Each program listing has associated program attributes such as genre (comedy, movies, sports, etc.), rating (TV-G, PG, etc.), critic's rating (one star, two stars, etc.), actors, scheduled program length, and other related parameters that can be tagged to a program. The system may compare the attributes of the programming that is viewed by the user with the attributes associated with the program listings in the database to locate suitable matches. The program listings whose program attributes most closely match the attributes of the program listings are presented to the user as viewing suggestions. If desired, the system may take into account the length of time the user views programs or other such criteria. Programs that are viewed the most may be given relatively higher weights than programs that the user only partially viewed.

The system may recommend programming based on the program attributes of the current program being viewed, the last program that was viewed, programming in general that the user has recently viewed, or the program attributes of some other suitable set of programming. The user may be presented with an option to choose whether the system bases its recommendations on the current program, the last program, or programming generally. In addition, the user may adjust weighting factors and other settings that influence the algorithm used by the system to make program suggestions. A neural network algorithm may be used to make programming suggestions.

The user may browse through suggested program listings using an adaptive browse feature. The adaptive browse feature displays an adaptive browse region on the user's television screen as a current television program is being displayed. The adaptive browse region contains a suggested program listing. The user may take actions from a user input interface device to scan through suggested program listings for other channels without interrupting the current television program.

The user may flip through suggested program listings using an adaptive flip feature. The adaptive flip feature displays an adaptive flip region on the user's television screen as the current television program is displayed. The adaptive flip region contains a suggested program listing. The user may scan through suggested program listings by taking actions from a user input interface device. Each time a user requests another suggestion, the system displays the next available suggested program listing, tunes the user's television equipment to that channel, and displays the program that is currently on that channel.

The system may be implemented by integrating the adaptive flip and adaptive browse features into an interactive television program guide. The adaptive flip and browse features may also be implemented as part of other applications or as part of a stand-alone application.

If the system supports both regular flip and browse features (in which all available programs listings are presented) and adaptive browse and flip features (in which only suggested program listings are presented), the user may be provided with an opportunity selectively enable the adaptive flip and browse features. The adaptive flip and browse features may be invoked using dedicated keys, certain combinations of keys, switches, menu options, or any other suitable technique.

When the adaptive flip and browse features have been turned on, these features may be invoked in the same ways that regular flip and browse features are invoked.

These and other objects of the invention are accomplished in accordance with the principles of the present invention by providing an interactive television program guide system having an interactive television program guide application Further features of the invention, its nature and various advantages will be more apparent from the accompanying drawings and the following detailed description of the preferred embodiments.

DETAILED DESCRIPTION OF THE PREFERRED EMBODIMENTS

Figure 1:
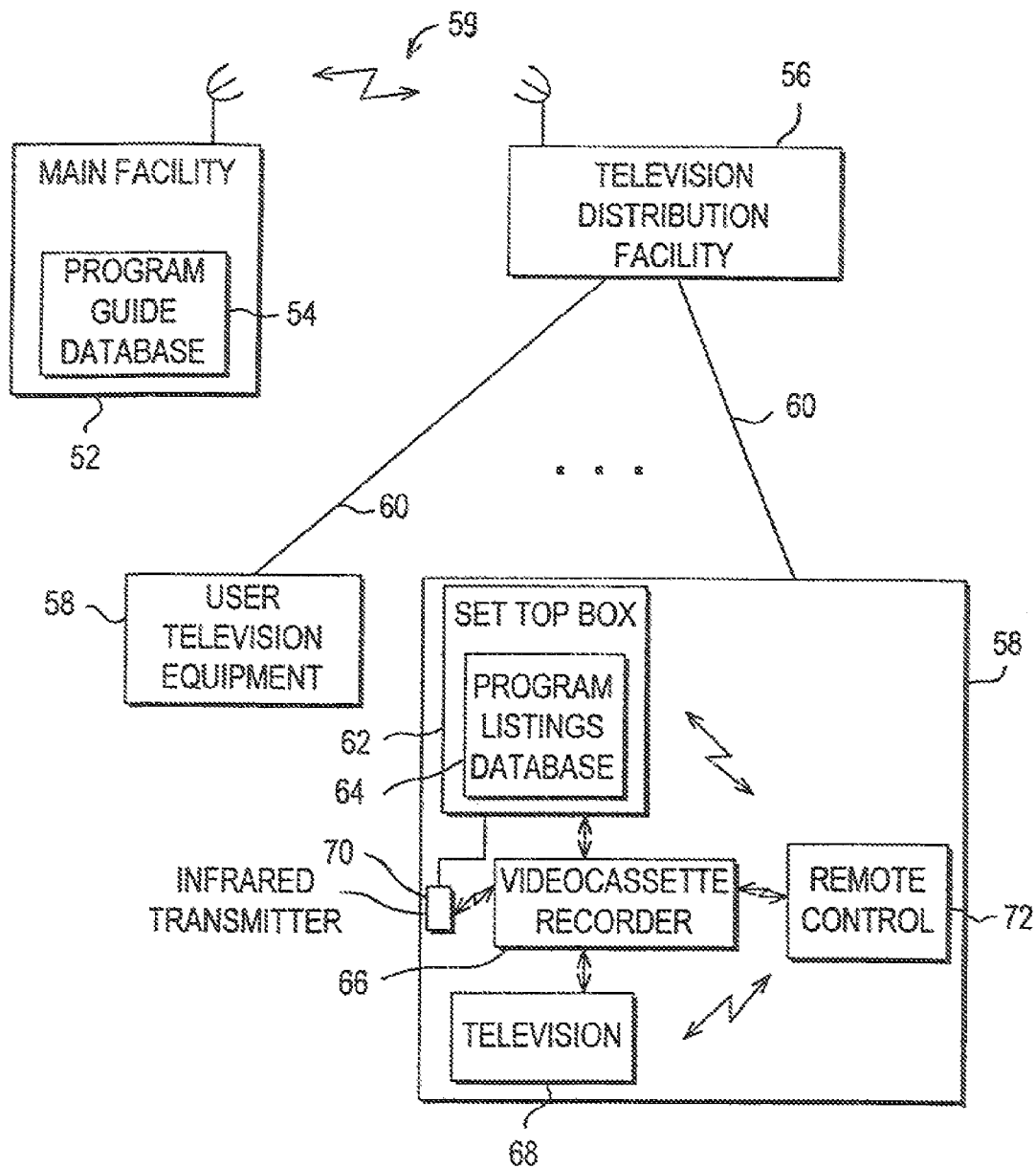
FIG. 1 is a diagram of an illustrative interactive television program guide system in accordance with the present invention.

An illustrative interactive television program guide system 50 in accordance with the present invention is shown in FIG. 1. Main facility 52 includes a program guide database 54 for storing program guide information (e.g., television program listings data, program-related information, service listings data, service-related information, pay-per-view ordering information, television program promotional information, etc.).

Figure 2:
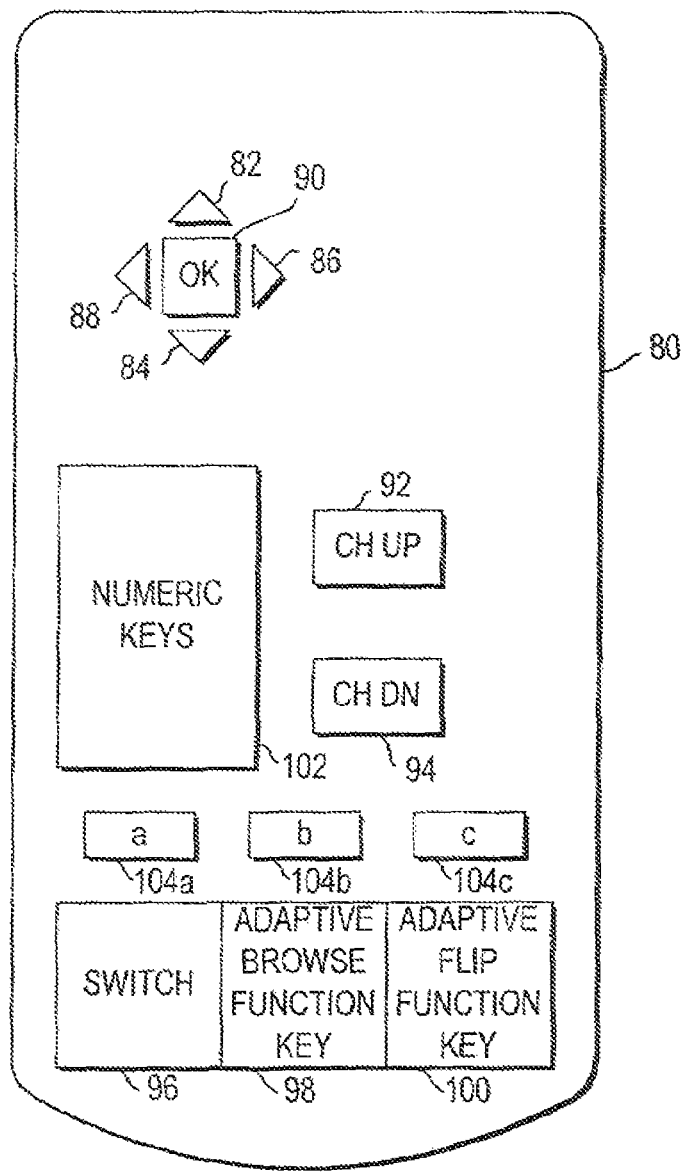
FIG. 2 is a simplified plan view of an illustrative remote control in accordance with the present invention.

Main facility 52 preferably includes a processor to handle information distribution tasks. Information from database 54 may be transmitted in parallel via communication links such as communication link 58 to multiple television distribution facilities such as television distribution facility 56. Only one television distribution facility is shown in FIG. 2 to avoid over complicating the drawings. Each communication link 58 may be a satellite link, a telephone network link, a combination of such links, or another suitable communication path. Text, graphics, and video data signals may be transmitted over link 58. If it is desired to transmit video signals over communication link 58, a relatively high bandwidth link such as a satellite link is generally preferable to a relatively low bandwidth link such as a telephone line.

Television distribution facility 56 is a facility such as a cable system headend, a broadcast distribution facility, or a satellite television distribution facility for distributing television signals to viewers.

The program guide information transmitted by main facility 52 to television distribution facility 56 includes television program listings data such as program times, channels, titles, descriptions, etc. Transmitted program guide information may include pay program data such as pricing information for individual programs and subscription channels, time windows for ordering programs and channels, telephone numbers for placing orders that cannot be impulse ordered, etc.

Television distribution facility 56 may distribute program guide information received from main facility 52 to user television equipment 58 via communication paths 60. User television equipment 58 may be any suitable equipment for providing television that contains sufficient processing capabilities to monitor viewing activities, analyze these activities and display appropriate program listings information for the user.

Communication paths 60 may be cable links, fiber optic links, satellite links, broadcast links, or other suitable link, or a combination of such links. Any suitable communications scheme may be used to transmit data over paths 60, including in-band transmissions, out-of-band transmissions, digital transmissions, analog transmissions, cable transmissions, satellite transmissions, over-the-air transmissions, multichannel multipoint distribution services (MMDS) transmissions, etc.

Communication paths 60 preferably have sufficient bandwidth to allow television distribution facility 56 to distribute television programming, program listings information, advertisements, and other information to user television equipment 58. Multiple television and audio channels (analog, digital, or both analog and digital) may be provided to user television equipment 58 via communication paths 60. If desired, some of the data may be distributed to user television equipment 58 by one or more distribution facilities that are separate from television distribution facility 56 using communication paths that are at least partly separate from communication paths 60.

The data distribution technique that is used to distribute data on paths 60 may depend on the type of information that is being distributed. For example, text and graphics may be distributed over an out-of-band channel using an out-of-band modulator or distributed in the vertical blanking interval lines of an analog video channel. Video information may also be distributed in this way, although large quantities of video information may be more efficiently distributed using one or more digital channels or streams on paths 60. Such digital channels or streams may also be used for distributing text and graphics.

Each user television equipment device 58 has a receiver which is typically a set-top box such as set-top box 62. The receiver may also be other suitable television equipment such as an advanced television receiver into which circuitry similar to set-top-box circuitry has been integrated or a personal computer television (PC/TV). For illustrative purposes, the present invention will be described in the context of user television equipment 58 that uses set-top boxes.

Each set-top box 62 preferably contains a processor to handle tasks associated with implementing an application on the set-top box 62 that assists the user in searching for programs related to the programs the user is watching. For example, a stand-alone application may be provided that supports adaptive browse and adaptive flip modes, as described more fully below. If desired, these tasks may be implemented using a program guide application. For clarity, the present invention will be described primarily in the context of such a program guide application and in the context of a program guide system. However, many aspects of the invention may be practiced in other types of systems or with other types of applications if desired.

Each set-top box 62 is typically connected to an optional videocassette recorder 66 so that selected television programs may be recorded. Videocassette recorder 66 is typically connected to a television 68.

To record a program, set-top box 62 tunes to a particular channel and sends control signals to videocassette recorder 66 (e.g., using infrared transmitter 70) that instructs video cassette recorder 66 to start and stop recording at the appropriate times.

Television program listings, advertisements, programming information, and other information may be displayed on television 68. Set-top box 62, videocassette recorder 66, and television 68 may be controlled using one or more remote controls or may be controlled using any other suitable user input interface device such as a wireless keyboard, mouse, trackball, dedicated set of keys, etc.

Certain program guide features, such as pay program purchasing, the purchasing of products or services, and data collection functions, may require that user television equipment 58 transmit data to television distribution facility 56 over communications paths 60. If desired, such data may be transmitted over telephone lines or other separate communications paths. If features such as these are provided using facilities separate from television distribution facility 56, some of the communications involving user television equipment 58 may be made directly with the separate facility (not shown).

If desired, an interactive television program guide may be implemented using a data-relay architecture. In such an architecture, television distribution facility 56 may serve as a data relay site and user television equipment 58 may be a data destination site. For example, as television distribution facility 56 receives information from main facility 52, television distribution facility 56 may continuously or periodically distribute information to user television equipment 58. In a data-relay architecture, a program guide implemented on user television equipment 58 may use a database (e.g., database 64) for storing program guide information at user television equipment. Program guide information may include program listings and program attributes. Program attributes may be information such as program title, program actors, program duration, program genre (e.g., sports, comedy, movies, etc.), program channel, scheduled program duration, program rating (e.g., TV-G, PG-13, etc.), program content rating (or critics=rating or star rating, e.g., 1 star, two stars, etc.) and other related parameters that can be tagged to a program. Television distribution facility 56 may also poll set-top boxes periodically for certain information (e.g., pay program account information or information regarding programs that have been purchased and viewed using locally-generated authorization techniques).

The features of the present invention may be implemented in a client-server arrangement or in a combination client-server and data-relay arrangement.

For clarity, the present invention is sometimes described primarily in the context of program guides that are implemented on user television equipment rather than in the context of program guides that are implemented partially on a server and partially on user television equipment or a more fully server-based architecture.

For illustrative purposes, the present invention is discussed in the context of using a remote control for the user input interface device. An illustrative remote control 80 is shown in FIG. 2. Remote control 80 may include up-navigation key 82, down-navigation key 84, right-navigation key 86, left-navigation key 88, OK key 90 (also sometimes called an enter or select key—for clarity all of which are referred to as an OK key), channel-up key 92, channel-down key 94, switch 96, adaptive browse function key 98, adaptive flip function key 100, numeric key pad 102, and dedicated function keys 104a, 104b, and 104c. Navigation keys 82, 84, 86, and 88 may also be known as arrow keys. Other remote control keys may include an information AINFO@ key, a record key, a volume control key, etc.

A highlight window in a program guide display screen may be moved in a desired direction using navigation keys 82, 84, 86, and 88. Data entry may be accomplished using OK key 90. Channel tuning control may be accomplished using channel-up and channel-down keys 92 and 94. Switch 96 may have plural positions for providing predetermined program guide modes or settings. Numeric key pad 102 may include number keys (not shown) for entry of numbers when necessary. Adaptive browse function key 98 and adaptive flip function key 100 may provide dedicated control of adaptive browse and adaptive flip modes respectively. Access to the adaptive flip and adaptive browse modes may be accomplished using keys other than adaptive browse function key 98 and adaptive flip function key 100. Dedicated button keys 104a, 104b, and 104c may have dedicated functionality for reducing the number of keys necessary for accessing program guide features. Use and operation of remote control keys are further discussed below in relation to program guide display screen and program guide control.

Figure 3:
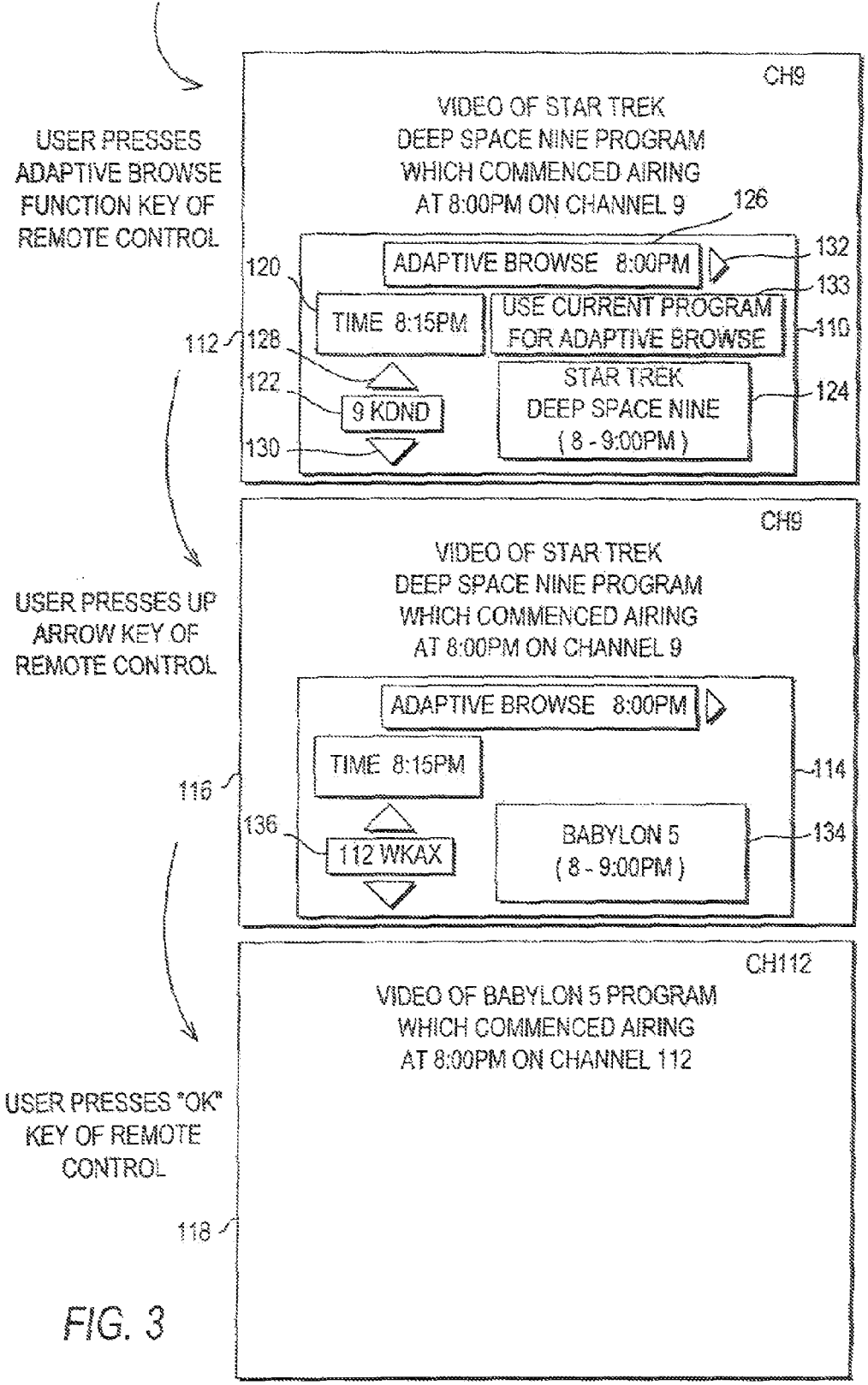
FIG. 3 is a diagram illustrating an adaptive browse display region on a television screen, an adaptive browse display region on a television screen that may be provided when a navigational key of a remote control is pressed, and a television screen that may be provided when a program listing is selected in accordance with the present invention.

As shown in FIG. 3, the program guide of the present invention may display illustrative adaptive browse display region 110 on illustrative television display screen 112, illustrative adaptive browse display region 114 on illustrative television display screen 116, and illustrative television screen 118. Television screen 112 may include video for a program, Star Trek Deep Space Nine, airing on a currently-tuned channel. When a user presses an adaptive browse function key on a remote control 80, adaptive browse display region 110 may be displayed on television screen 112. Adaptive browse display region 110 may provide program listing information while television screen 112 continues to include video of the program airing on the currently tuned channel, Star Trek Deep Space Nine.

Adaptive browse display region 110 may be displayed when a user presses an adaptive browse function key on remote control 80. Adaptive browse display region 110 may include time portion 120, channel identification portion 122, program information portion 124, time window portion 126, up-direction portion 128, down-direction portion 130, right-direction portion 132, and option 133 for selecting to use the current program in determining programs for adaptive browse.

Time window portion 126 may include information identifying a program listing time window.

Time window portion 126 may also include on-screen confirmation of browse or adaptive browse mode. Channel identification portion 122 may include an identification of a channel. Initially, channel identification portion 122 may include an identification of the currently tuned channel. Program information portion 124 may include information on a program airing on the channel identified in channel identification portion 122 in the time window identified in time window portion 126.

Initially, program information portion 124 may include information on the current program being watched when adaptive browse display region 110 is invoked, Star Trek Deep Space Nine on channel 9. Time portion 120 may include an indication of the current time. Right-direction portion 132 may include a right direction arrow indicating that information on a future time window is available. Up-direction portion 128 and down-direction portion 130 may include direction arrows indicating up and down channel browse availability. During the display of adaptive browse display region 110, the system may monitor the viewing activity of the user to determine one or more program attributes of the programming viewed by the user. For example, if the user has viewed the current program for a predetermined minimum period or, if the user has selected option 133 which indicates that the attributes of the current program are to be used, the system may determine the genre program attribute for the current program. The system then locates program listings for current programs that match that genre and displays those program listings in an adaptive flip or an adaptive browse display. Flip-type displays are displays that contain individual program listings. Flip displays are activated whenever the user changes channels with the channel up or down keys. The program listing in the flip display is always in sync with the current channel. Browse-type displays contain program listings that are not always in sync with the current channel. Rather, the user may use arrow keys to browse listings for programs on other channels. The up and down arrow keys may change the channel for the suggested program listing for browse-type displays and not change the channel for the television program being displayed on the user=s television screen. The user may browse future suggested program listings by pressing a right arrow key.

Adaptive browse display screen 114 may be displayed on television screen 116 when a user selects an up-navigation key 82 on a remote control 80 from adaptive browse display region 110. As in television screen 112, television screen 116 includes video of the program airing on the currently tuned channel, Star Trek Deep Space Nine on channel 9. Adaptive browse display screen 114 may include program information portion 134 that contains a viewing suggestion for a current program on a different channel. For example, program information portion 134 may include information on a program, Babylon 5, that is currently being shown on channel 112 and that is related by genre (science fiction) to the current television program (Star Trek Deep Space Nine). Program information portion 134 may include the scheduled time and duration of the program.

Channel identification portion 136 of adaptive browse display region 114 may include an identification of the channel, WKAX channel 112, associated with the program, Babylon 5, suggested in program information portion 134. Each time the user presses up-navigation key 82 (FIG. 2), the system locates the next channel that has programming of the same type as that being viewed by the user. The adaptive browse feature skips over channels whose programming is not related to the programming to the programming on the current channel.

When the user selects an OK key while adaptive browse display region 114 is being displayed, the channel identified in channel identification portion 136, WKAX channel 112, may be tuned to and television screen 118 may be displayed. Television screen 118 may include video of the program, Babylon 5, airing on the channel that was tuned to and the program may be identified in program information region 134.

Figure 4:
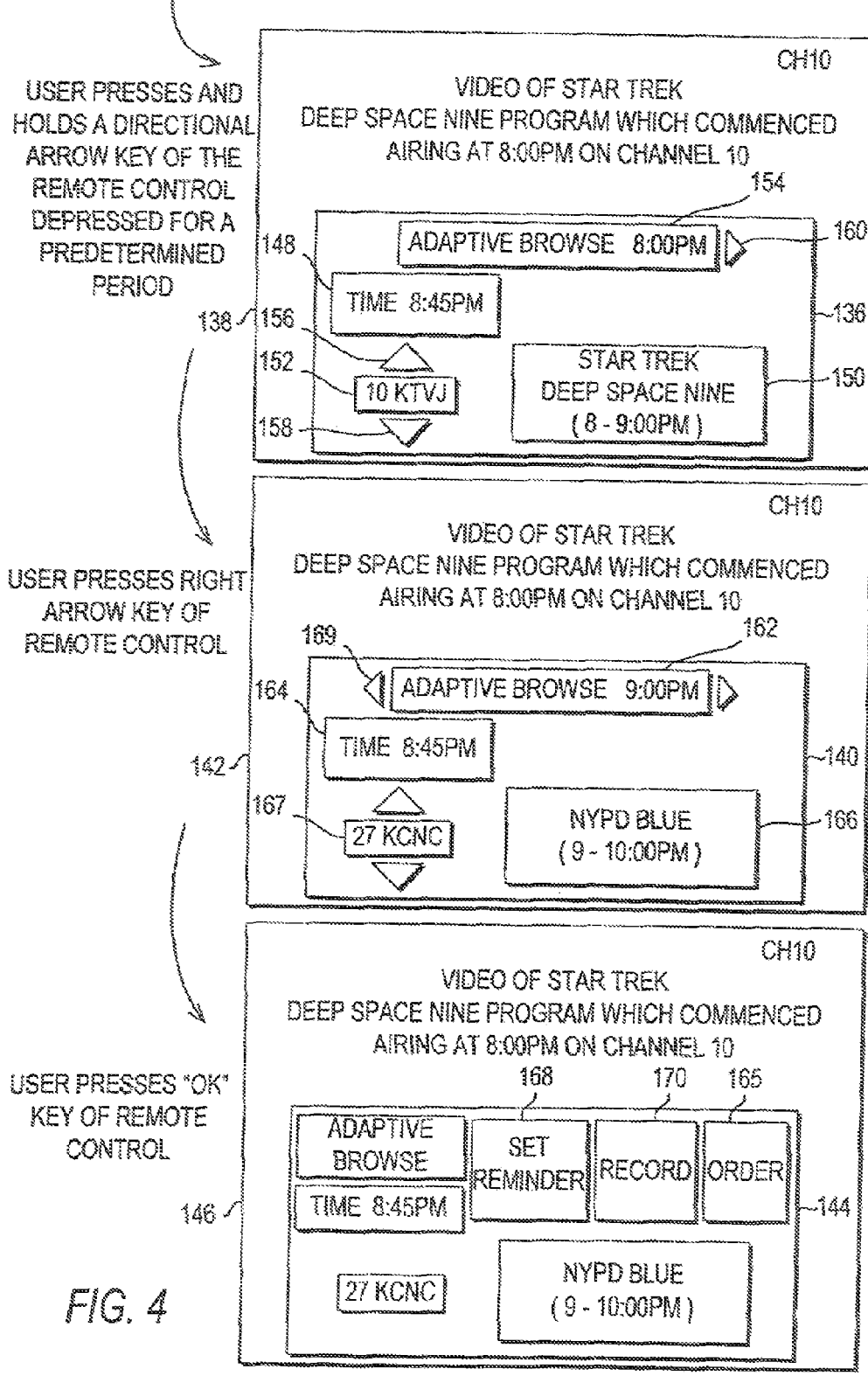
FIG. 4 is a diagram illustrating an adaptive browse display region on a television screen, an adaptive browse display region on a television screen that may be provided when a navigation key of a remote control is pressed, and an adaptive browse display region on a television screen that may be provided when a program listing is selected in accordance with the present invention.

As shown in FIG. 4, the adaptive browse function may be used to assist the viewer in selecting future programming. The system may display illustrative adaptive browse display region 136 on illustrative television screen 138, illustrative adaptive browse display region 140 on illustrative television screen 142, and illustrative adaptive browse display region 144 on illustrative television screen 146. Television screen 138 may include video of a program, Star Trek Deep Space Nine that is airing on the channel to which user television equipment 58 is currently tuned channel, KTVJ channel 10. Adaptive browse mode may be invoked using any suitable technique. For example, adaptive browse mode may be invoked when a user presses and holds a navigation key on remote control 80 for a predetermined time period. Adaptive browse display region 136 may be displayed on television screen 138. Adaptive browse display region 136 may provide program listing information while television screen 138 continues to include video of the program, Star Trek Deep Space Nine, that is airing on the channel to which user television equipment 58 is currently tuned (KTVJ channel 10).

Adaptive browse display region 136 may include program information portion 150, time portion 148, channel identification portion 152, time window portion 154, up-direction portion 156, down-direction portion 158, and right-direction portion 160. Time portion 148 may indicate the current time to be 8:45 PM. Initially, the scheduled time of the current program, 8:00 PM to 9:00 PM, may be included in the program information portion 150.

When a right-navigation key of a remote control is selected from adaptive browse display region 136, adaptive browse display screen 140 may be displayed on television screen 142. Adaptive browse display screen 140 may include the same display portions as adaptive browse display region 136. Adaptive browse display region 140 may also include a left-direction portion 169. Left-direction portion 169 may include a left direction arrow indicating that information for an earlier time window is available. As in television screen 138, television screen 142 includes video of the program airing on the channel to which the system is currently tuned, Star Trek Deep Space Nine on channel 10. Time window portion 162 of adaptive browse display region 140 may include information identifying a future time window. For example, time window portion 162 may identify a 9:00 PM time window. Program information portion 166 of adaptive browse display screen 140 may include information on a program, NYPD Blue. The program, NYPD Blue, may be a program suggested for viewing based on characteristics of user-viewing activity that the system determined when the viewer was watching Star Trek Deep Space Nine. Program information portion 166 may include the scheduled time and duration of the suggested program (e.g., 9:00 PM to 10:00 PM in the example of FIG. 4). Channel identification portion 167 of adaptive browse display region 140 may include an identification of the channel, KCNC channel 27, associated with the suggested program, NYPD Blue.

Selecting an OK key may indicate that a user is interested in accessing the upcoming program identified in program information portion 166. When a user selects an OK key from adaptive browse display region 140, adaptive browse display region 144 may be displayed on television screen 146. Adaptive browse display region 144 may include set-reminder option 168, record option 170, and order option 165 that are user-selectable. Set-reminder option 168 may provide an opportunity to set a reminder to view the program identified in program information region 166. Record option 170 may provide an opportunity to automatically record the program identified in program information region 166. Order option 165 may provide an opportunity to order the upcoming program (e.g., pay per view program).

Figure 5:
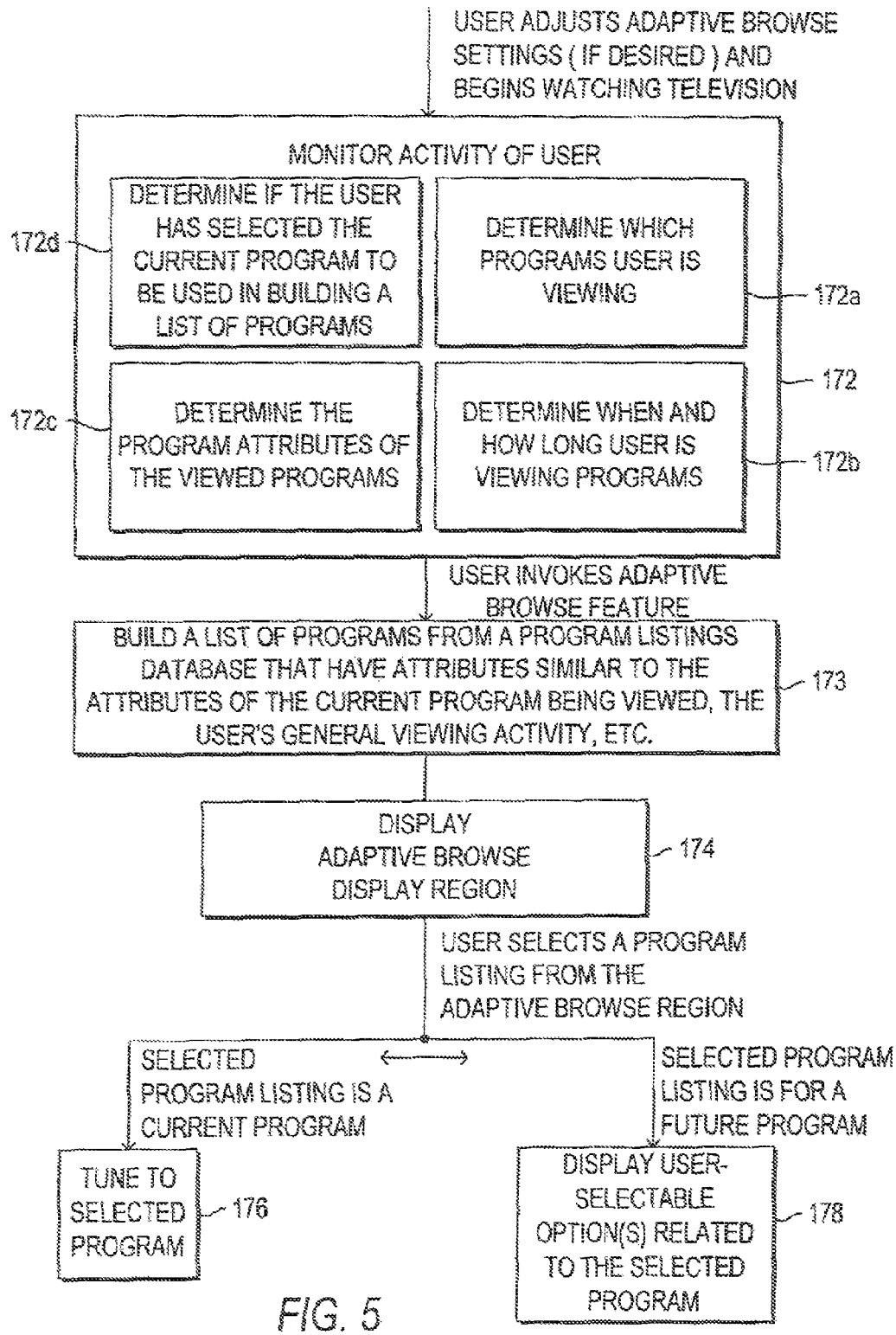
FIG. 5 is a flow chart of illustrative steps involved in providing an embodiment of an adaptive browse feature in accordance with the present invention.

Illustrative steps involved in providing an adaptive browse feature such as the adaptive browse feature of FIG. 3 and FIG. 4 are shown in FIG. 5. Initially, the user adjusts any adjustable adaptive browse settings and begins to watch television. At step 172, the program guide monitors the viewing and program guide activity of the user. Step 172 may involve determining which programs the user is watching (substep 172a), determining when and for how long the user is watching certain programs (substep 172b), determining the program attributes of the programs being viewed (step 172c), and determining if the user has selected the current program to be used in building a list of programs (step 172d). The program attribute for the programs being viewed are stored in a database such as program listings database 64 of FIG. 1. When the user invokes the adaptive browse feature, the system builds a list of programs from a program listings database such as program listings database 64 of FIG. 1 whose program attributes match (or are otherwise similar to) the program attributes of programming viewed by the user. The programming viewed by the user may be the current program being viewed the last program viewed for a substantial length of time, or may be general programming that the user has viewed.

The list may be built when the adaptive browse feature is first activated concurrently with step 172, or at any other suitable time. At step 174, the program guide may display an adaptive browse display region. The adaptive browse region may include a program listing for one of the programs on the list that was built at step 172. The program listings may be for either a current program or a future program. The program listing may be selected by a user. When a user selects a program listing for a current program, the program guide may tune to the channel airing the current program at step 176. When a user selects a program listing for a future program, the program guide may display one or more user-selectable options related to the future program at step 178.

Figure 6:
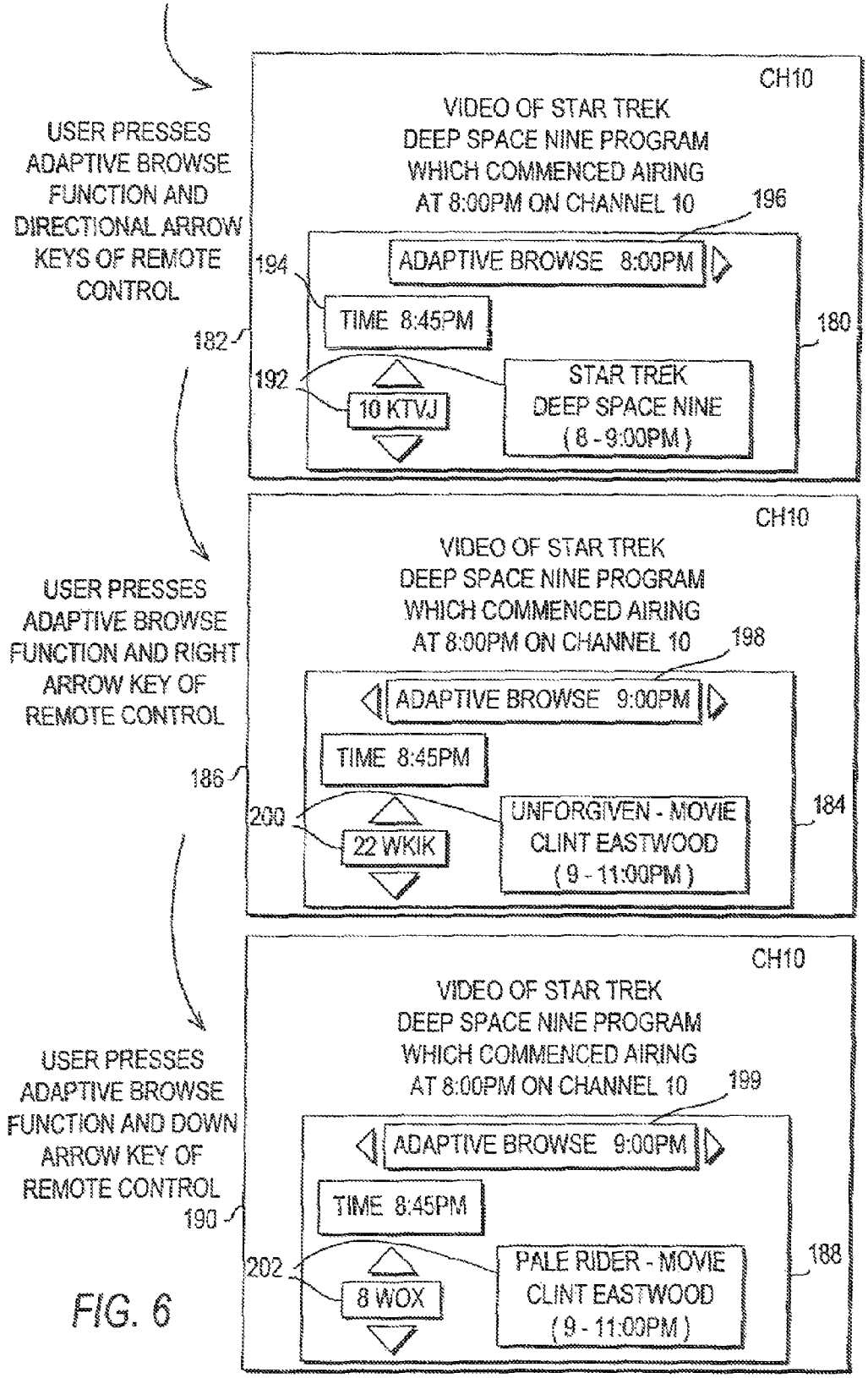
FIG. 6 is a diagram illustrating an adaptive browse display region on a television screen, an adaptive browse display screen on a television screen that may be provided when a Aright@ navigation key of a remote control is pressed, and an adaptive browse display region on a television screen that may be provided when a Adown@ navigation key of a remote control is pressed in accordance with the present invention.

Another way in which the user may invoke and use the adaptive browse feature is by pressing a dedicated adaptive browse function key whenever the user presses a navigation cursor key. This is shown in FIG. 6. As shown in FIG. 6, the program guide of the present invention may display illustrative adaptive browse display region 180 on illustrative television screen 182, illustrative adaptive browse display region 184 on illustrative television screen 186, and illustrative adaptive browse display region 188 on illustrative television screen 190. Television screen 182 may include video of a program airing on a channel currently tuned to and being watched when adaptive browse display region 180 is invoked. Television screen 182 may include video of a program, Star Trek Deep Space Nine, airing on a currently tuned channel, KTVJ channel 10. When a user presses an adaptive browse function key and a navigation key of a remote control, adaptive browse display region 180 may be displayed on television screen 182. Adaptive browse display region 180 may include a program listing portion 192 for Star Trek Deep Space Nine. Program listing portion 192 may include a program information portion and a program channel identification portion. Adaptive browse display region 180 may also include current time portion 194 and time window portion 196.

Time window portion 196 identifies the program listing time window of interest (e.g., the 8:00 PM time window). Current time portion 194 may indicate the current time (e.g., 8:45 PM).

When a user selects an adaptive browse function key and a right-navigation key from adaptive browse display region 180, adaptive browse display screen 184 may be displayed on television screen 186. As in television screen 182, television screen 186 may include video of the program airing on the currently tuned channel, Star Trek Deep Space Nine on channel 10.

Adaptive browse display region 184 may include time window portion 198 identifying the program listing time of window of interest to be the 9:00 PM time window. Adaptive browse display region 184 may include program listing portion 200. Program listing portion 200 may identify a program, the movie Unforgiven staring Clint Eastwood on WKIK channel 22, as a viewing suggestion for the 9:00 PM time window based on the fact that the user was watching Star Trek Deep Space Nine (both programs involve action/adventure).

Adaptive browse display screen 188 may be displayed on television screen 190 when a user selects an adaptive browse function key and a down-navigation key from adaptive browse display region 184. As in television screens 182 and 186, television screen 190 may include video of the program airing on the currently tuned channel, Star Trek Deep Space Nine on channel 10. Adaptive browse display region 188 may include time window portion 199 identifying the program listing time window of interest to be the 9:00 PM time window. Adaptive browse display region 188 may include program listing portion 202. Program listing portion 202 may identify another program, Pale Rider on WOX channel 8, as another viewing suggestion for the 9:00 PM time window based on the fact that Pale Rider and Star Trek Deep Space Nine are both programs that involve action/adventure. From adaptive browse display region 188, an OK key may be selected to access user-selectable options such as record and set-reminder options related to Pale Rider on WOX channel 8 at 9:00 PM.

Thus, in addition to illustrating how a user may invoke and use the adaptive browse feature with a different set of remote control keys, the example of FIG. 6 shows how the user may view suggested program listings for various future programs (based on the programming viewed by the user) by using the right arrow key to move to a future time slot and subsequently using the up/down arrow keys to browse the listings in that slot that are related to the programming viewed by the user (e.g., the current program, the last program viewed, or various programs recently viewed by the user).

Figure 7:
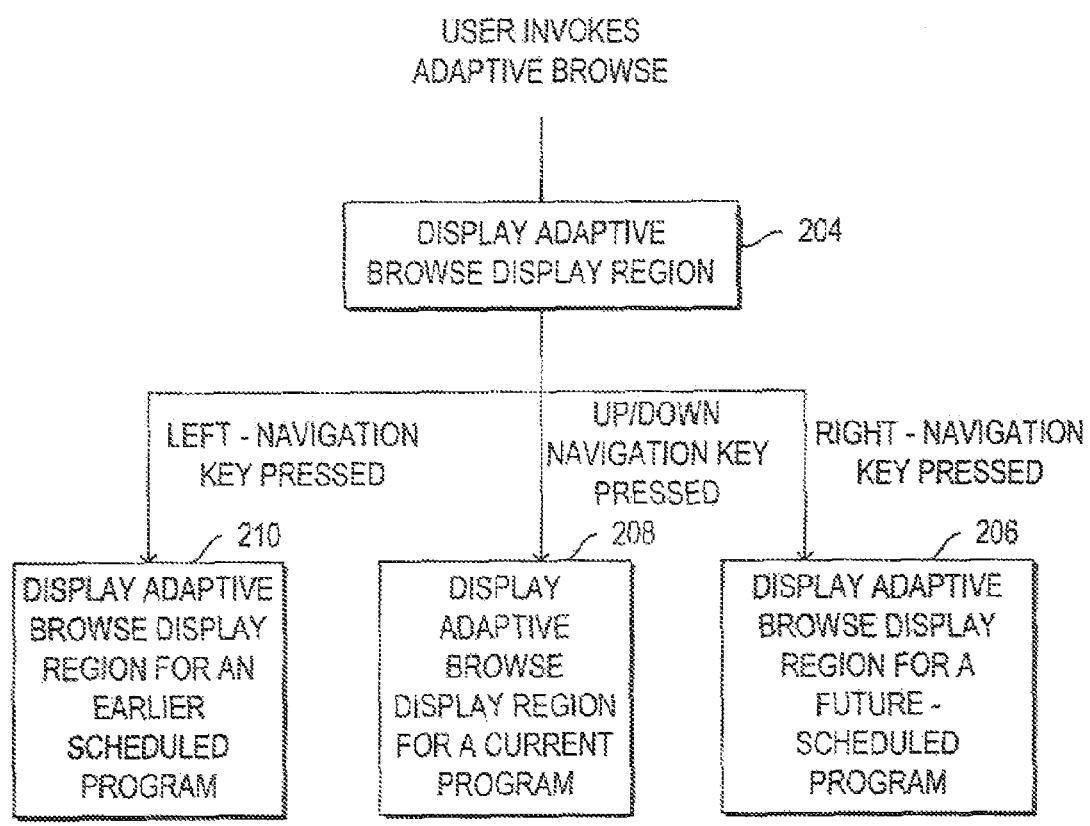
FIG. 7 is a flow chart of illustrative steps involved in providing an adaptive browse display region in response to user selection of a remote control navigation key in accordance with the present invention.

Illustrative steps involved in providing an adaptive browse feature such as the adaptive browse feature of FIG. 6 are shown in FIG. 7. At step 204, an adaptive browse display region may be displayed in response to user actions. Initially, program listing information for the program airing on the currently tuned channel may be included in the adaptive browse display region. At step 208, When a user presses an up or down navigation key alone or in combination with other keys such as an adaptive browse function key (FIG. 6), an adaptive browse display region for a currently scheduled program on another channel may be displayed. At step 206, when a user presses a right-navigation key alone or in combination with other keys such as an adaptive browse function key (FIG. 6), an adaptive browse display region for a future-scheduled program may be displayed. At step 210, when a user presses a left-navigation key alone or in combination with other keys such as an adaptive browse function key (FIG. 6), an adaptive browse display region for an earlier scheduled program may be displayed. A program listing for a currently scheduled program, for an earlier-scheduled program, or for a future-scheduled program may be determined for an adaptive browse display screen based on characteristics of user-viewing activity. Additional adaptive display regions for currently scheduled, earlier-scheduled, or future-scheduled programs may be displayed in response additional remote control key strokes.

If desired, the adaptive browse feature may be invoked using a remote control switch 96 of FIG. 2.

Figure 8:
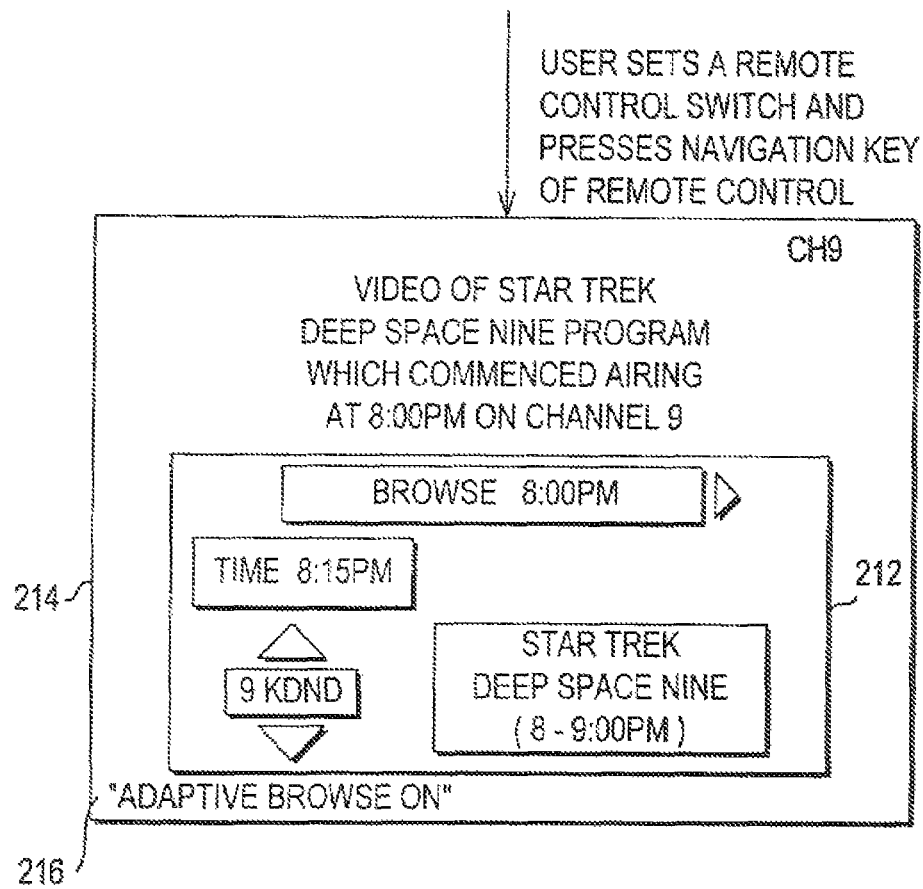
FIG. 8 is a diagram illustrating an adaptive browse display region and an on-screen adaptive browse confirmation on a television screen that may be provided after a user presses a sequence of remote control keys in accordance with the present invention.

As shown in FIG. 8, the program guide of the present invention may display illustrative adaptive browse display region 212 on illustrative television screen 214. Adaptive browse display region 212 may be invoked when a user sets a remote control switch and presses a navigation key. Television screen 214 may include video of Star Trek Deep Space Nine which commenced airing on the currently tuned channel, KDND channel 9, at 8:00 PM and was being watched when adaptive browse display region 212 was invoked. Television screen 214 may include an on-screen adaptive browse confirmation portion 216. On-screen adaptive browse confirmation portion 216 may indicate that the adaptive browse feature has been enabled. On-screen adaptive browse confirmation portion 216 may be in the form of text (e.g., ADAP- TIVE BROWSE ON). An on-screen adaptive browse confirmation indicator may be provided whenever desired, regardless of which technique is used to invoke or enable the adaptive browse feature.

Figure 9:
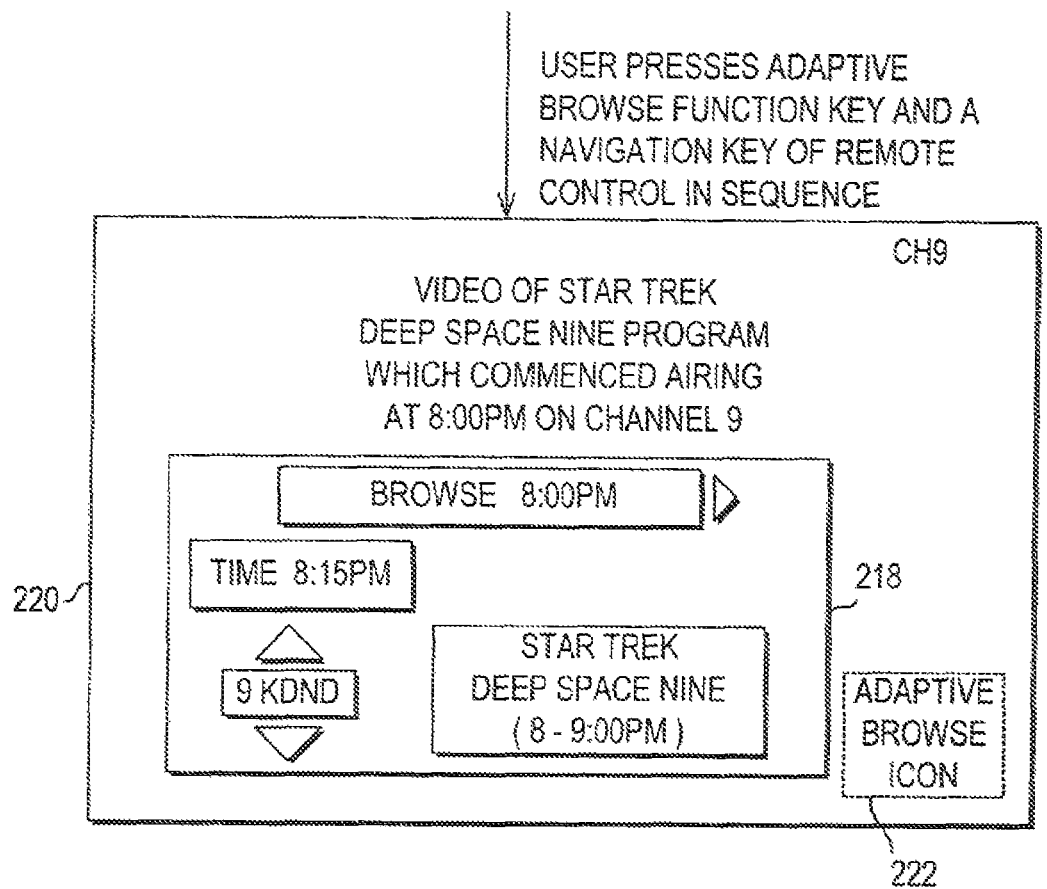
FIG. 9 is a diagram illustrating a browse display region and an on-screen adaptive browse confirmation on a television screen that may be provided after a user presses a sequence of remote control keys in accordance with the present invention.

As shown in FIG. 9, the adaptive browse feature may be invoked when the user presses an adaptive browse function key (such as adaptive browse function key 98 of FIG. 2) and a navigation key (such as one of navigation keys 82, 84, 86, and 88 of FIG. 2). the program guide of the present invention may display illustrative adaptive browse display region 218 on illustrative television screen 220. Adaptive browse display region 218 may be invoked when a user presses an adaptive browse function key and a navigational key on a remote control. Television screen 220 may include video of Star Trek Deep Space Nine which commenced airing on the currently tuned channel, KDND channel 9, at 8:00 PM and was being watched when adaptive browse display region 218 was invoked. Television screen 214 may include an on-screen adaptive browse confirmation portion 222. On-screen adaptive browse confirmation portion 216 may be in the form of an icon. The icon may be a translucent figure.

Figure 10:
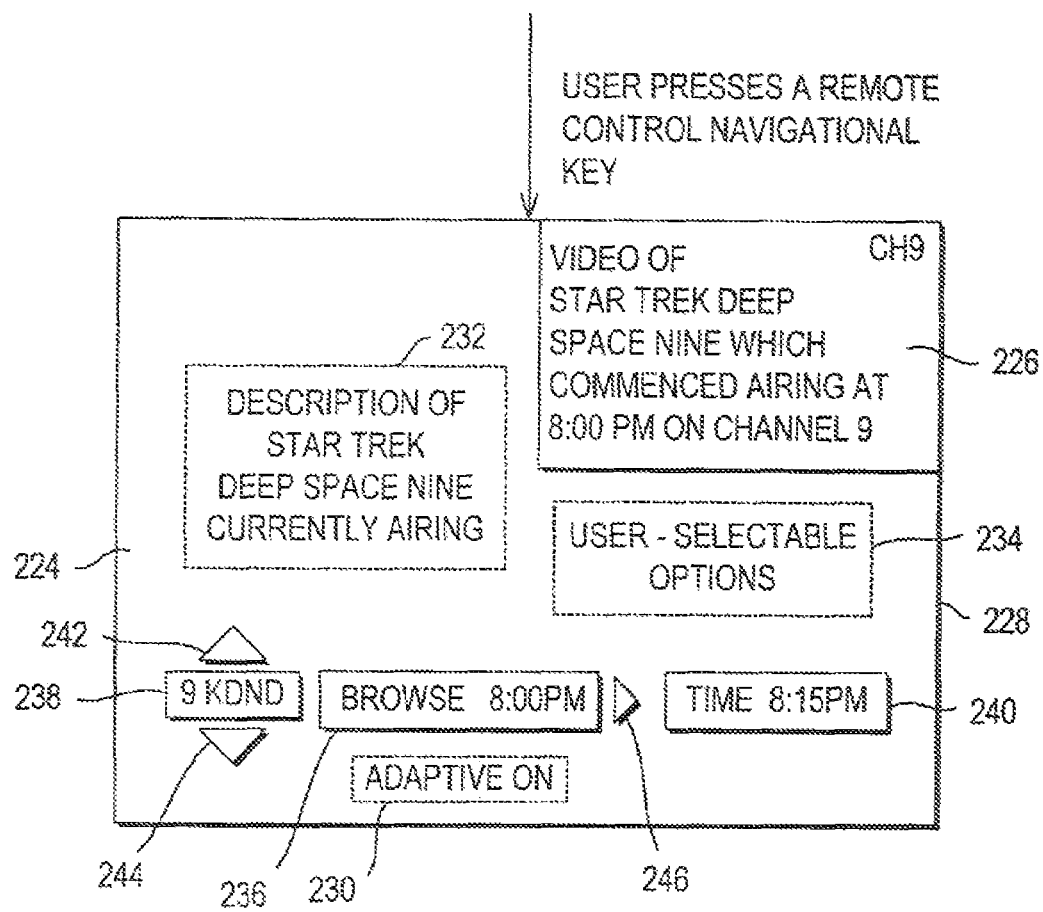
FIG. 10 is a diagram illustrating an adaptive browse display screen having an adaptive browse display region and a compressed video display region in accordance with the present invention.

As shown in FIG. 10, the program guide of the present invention may display illustrative television screen 228 having an illustrative L-shaped adaptive browse display region 224 and an illustrative reduced-size video display region 226. Adaptive browse display region 224 may be invoked when a user presses a remote control navigation key or other suitable technique. Video of Star Trek Deep Space Nine, which has commenced airing on the currently tuned channel, may be reduced in size and included in video display region 226 when adaptive browse display region 224 is invoked. Adaptive browse display region 224 may include an on-screen adaptive browse confirmation portion 230. Adaptive browse display region 224 is large enough that it typically has room for more information or options than adaptive browse display region 218 of FIG. 9. Adaptive browse display region 224 may include program description portion 232, options portion 234, time window portion 236, channel identification portion 238, current time portion 240, up-direction portion 242, down-direction portion 244, and right-direction portion 246.

Figure 11:
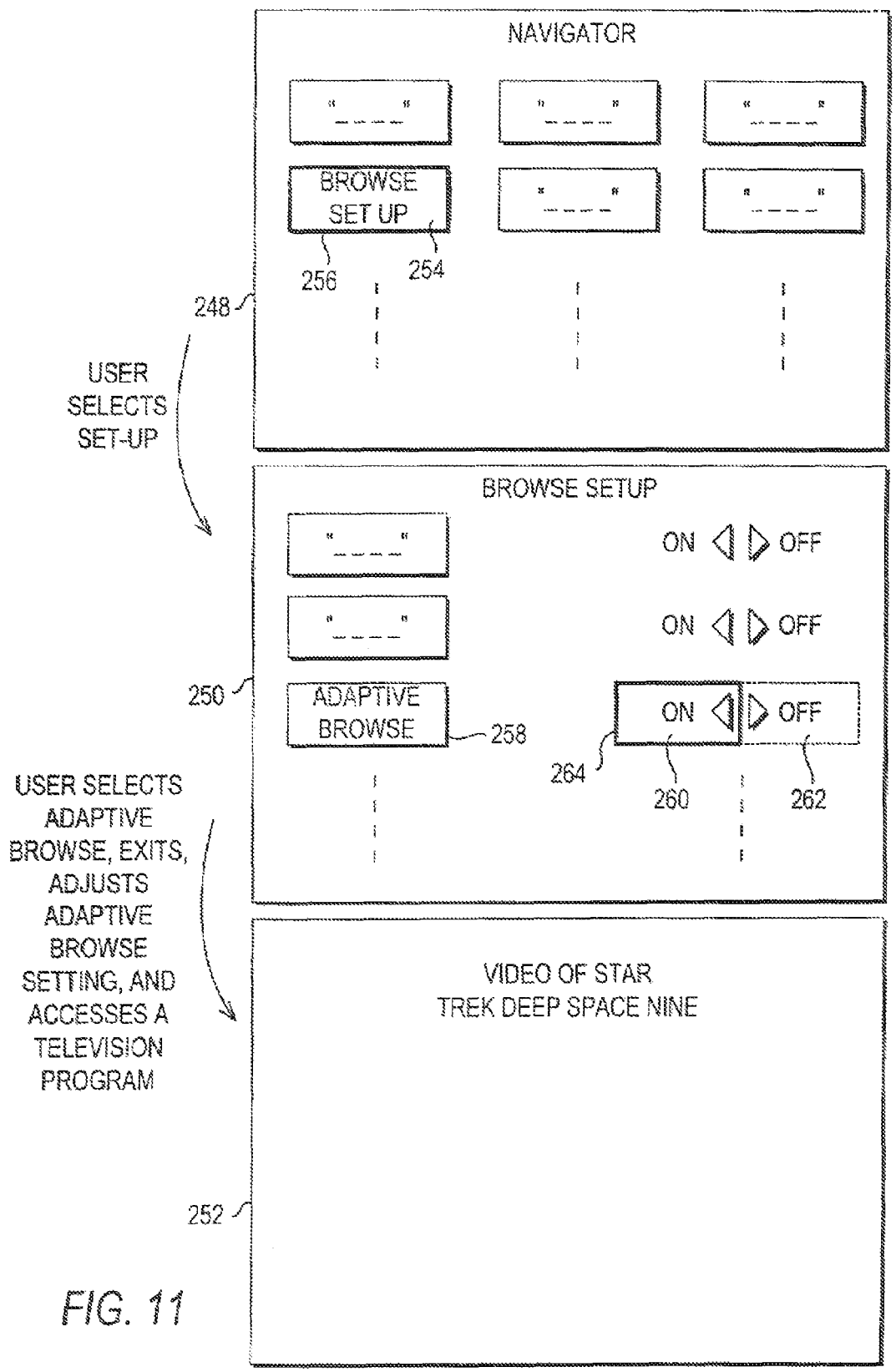
FIG. 11 is a diagram illustrating a navigator display screen, a browse setup display screen that may be provided when a user selects browse setup, and a television screen that may be provided when a browse setup display screen is exited in accordance with the present invention.

As shown in FIG. 11, the program guide of the present invention may display a menu (illustrative navigator display screen 248), a setup screen (illustrative browse setup display screen 250), and illustrative television screen 252. Navigator display screen may include browse setup option 254. Browse setup option 254 may be selected by positioning highlight window 256 on browse setup option 254 and pressing a data entry key (e.g. an OK key on a remote control). Browse setup display screen 250 may be displayed when a user selects browse setup option 254.

Browse setup display screen 250 may include adaptive browse option 258 and may include Aon@ and Aoff@ portions 260 and 262 associated with adaptive browse option 258. Positioning highlight window 264 on Aon@ portion 260 allows the user to adjust this setting so that the program guide browse feature is placed in adaptive mode (i.e., adaptive browse mode is enable). Selecting Aoff@ portion 262 disables adaptive browsing and enables only standard browsing (in which program listings for all channels may be browsed, not just those related to the user=s viewing activity). After enabling adaptive browse mode, a user may exit the browse setup display screen 250 to access television screen 252.

Figure 12:
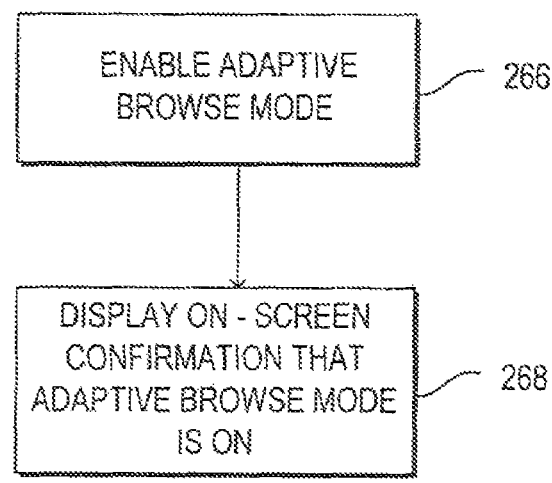
FIG. 12 is a flow chart of illustrative steps involved in providing an on-screen confirmation of adaptive browse mode in accordance with the present invention.

An adaptive browse confirmation may be displayed continuously whenever the adaptive browse feature has been enable (as opposed to a conventional browse feature) or only when adaptive browse mode is invoked (i.e., during adaptive browsing). Illustrative steps involved in providing an on-screen confirmation that the adaptive browse feature has been enabled such as on-screen adaptive browse confirmation portion 216 of FIG. 8 are shown in FIG. 12. At step 266, adaptive browse mode may be enabled by pressing a set of keys, turning on a switch, selecting an option from a browse setup display screen, activating a set-top box, pressing a dedicated set-top box button, etc. At step 268, on-screen confirmation that adaptive browse mode is on may be displayed.

Figure 13:
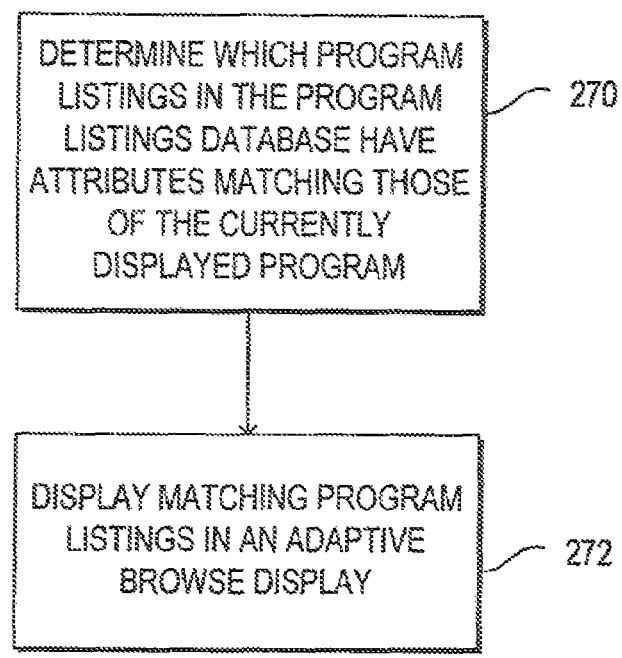
FIG. 13 is a flow chart of illustrative steps involved in providing an adaptive browse display region based on attributes of the currently displayed program in accordance with the present invention.

Illustrative steps involved in providing an adaptive browse display region in which the suggested program listing is based on the current program the user is watching are shown in FIG. 13. At step 270, the program guide (or other application) may determine which program listings in the program listings database (e.g., program listings database 64 of FIG. 1) have associated attributes (such as genre, rating, actors, etc.) that best match those of the currently displayed program. At step 272, an adaptive browse display region may be displayed for each of the matching program listings.

Figure 14:
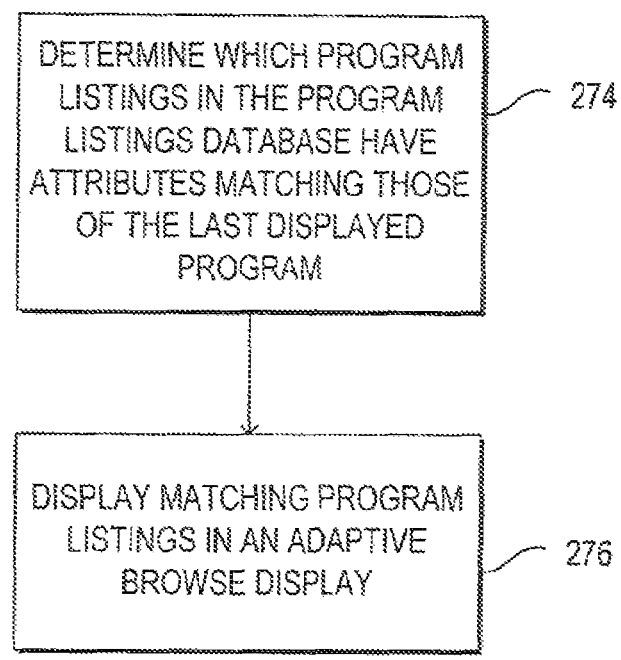
FIG. 14 is a flow chart of illustrative steps involved in providing an adaptive browse display region based on attributes of the last displayed program in accordance with the present invention.

Illustrative steps involved in providing an adaptive browse display region in which the suggested program listing is based on the last displayed program are shown in FIG. 14. At step 274, the program guide (or other application) may determine which program listings in the program listings database (e.g., program listings database 64 of FIG. 1) have associated attributes matching those of the last displayed program. The last displayed program is the last program which was viewed in substantial length (e.g., 150 minutes or more, or 75% of its length). At step 276, an adaptive browse display region may be displayed for each of the matching program listings.

Figure 15:
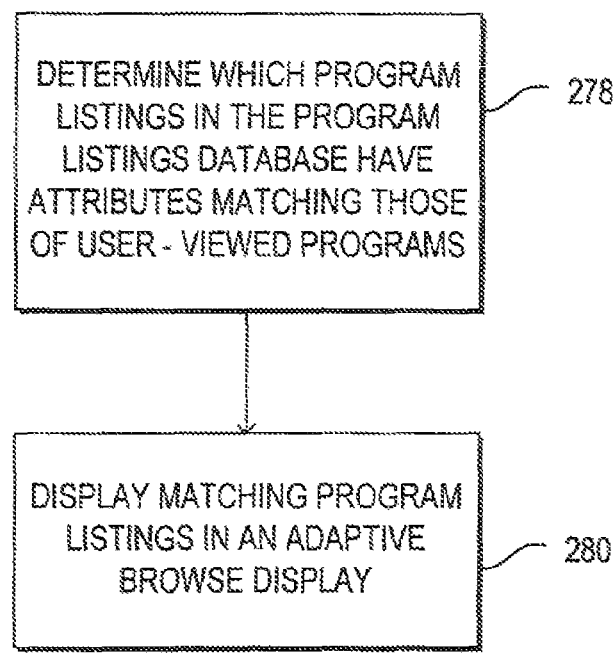
FIG. 15 is a flow chart of illustrative steps involved in providing a list of programs for an adaptive browse display region based on attributes of user-viewed programs in accordance with the present invention.

Illustrative steps involved in providing an adaptive browse display region in which the suggested program listing is based on programs recently viewed by the user are shown in FIG. 15. At step 278, the program guide (or other application) may determine which program listings in the program listings database (e.g., program listings database 64 of FIG. 1) may have associated attributes matching those of recently-viewed programs (e.g., programs viewed in the last month, day, hour, etc.). At step 280, an adaptive browse display region may be displayed for each of the matching program listings. As with all adaptive flip and browse displays, the display region preferably contains no more than one program listing at a time, which simplifies the viewing experience.

Figure 16:
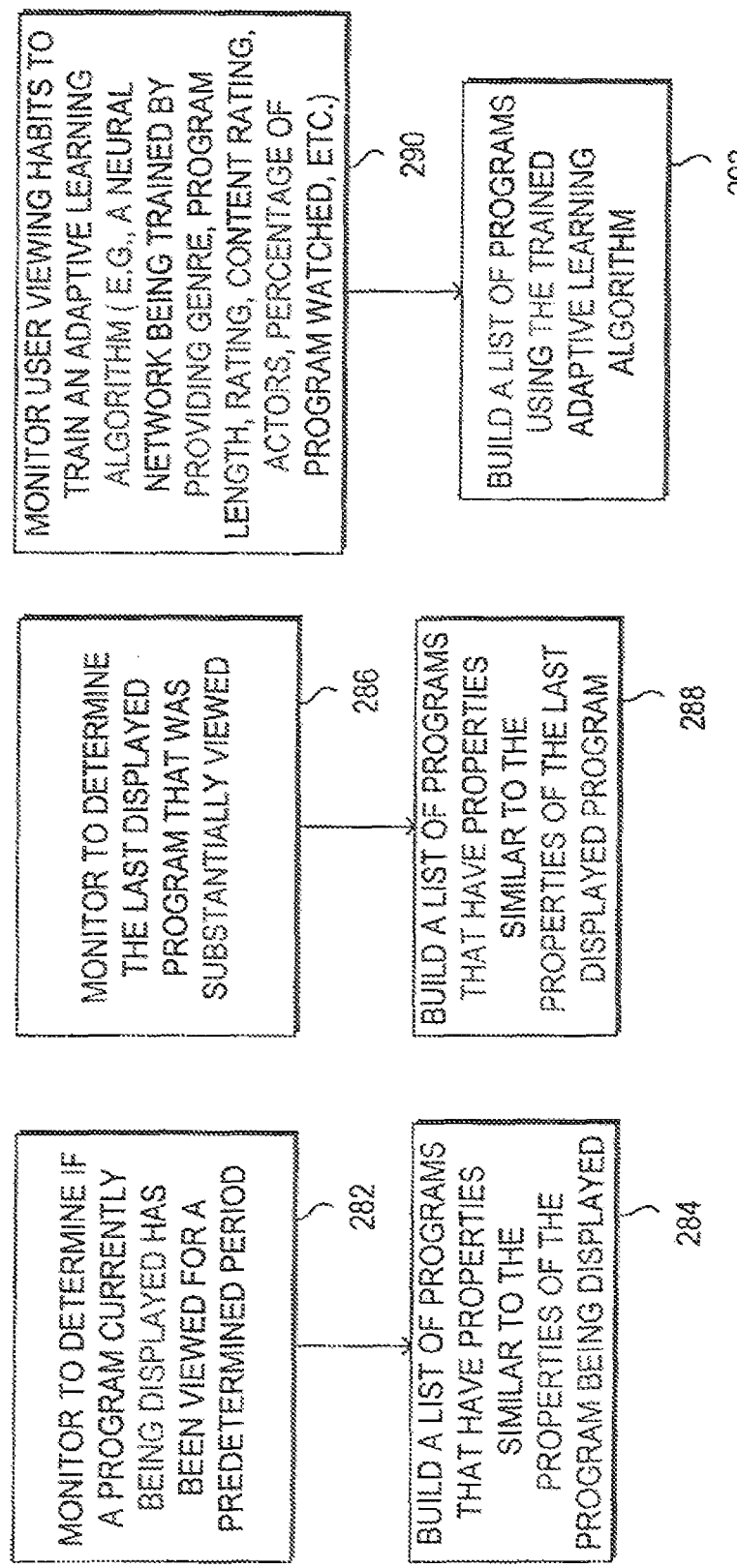
FIG. 16a is a flow chart of illustrative steps involved in providing a list of programs based on the currently displayed program in accordance with the present invention.
FIG. 16b is a flow chart of illustrative steps involved in providing a list of programs based on a previously displayed program in accordance with the present invention.
FIG. 16c is a flow chart of illustrative steps involved in providing a list of programs based on television viewing habits in accordance with the present invention.

Illustrative steps involved in determining which adaptive browse program listings have attributes similar to those of the current program are shown in FIG. 16a. At step 282, the program guide (or other application) may monitor a user=s viewing activity to determine whether a program currently being displayed has been viewed for at least a predetermined period of time (e.g., ten minutes). At step 284, the program guide (or other application) may build a list of programs that have attributes similar to the attributes of the program that has been viewed for the predetermined period. The list of programs may be built using information from a program listings database maintained on the user television equipment or other suitable location (e.g., at a television distribution facility).

Illustrative steps involved in determining which adaptive browse program listings are similar to those of the last viewed program are shown in FIG. 16b. At step 286, the program guide (or other application) may determine the last displayed program that was substantially viewed (e.g., a channel airing a program was tuned to for seventy five percent of the program length). At step 288, the program guide (or other application) may build a list of programs that have properties similar to the properties of the last viewed program. The list of programs may be built from a program listings database such as program listings database 64 at user television equipment 58 (FIG. 1).

Illustrative steps involved in determining which adaptive browse program listings have attributes similar to those of recently viewed programming are shown in FIG. 16c. At step 290, the program guide (or other application) may monitor user program viewing activity to train an adaptive learning algorithm (e.g., a neural network algorithm or other suitable algorithm). The training period may be, for example, several hours, several days, or more, and may be open-ended if desired. At step 292, the program guide (or other application) may build a list of programs from a program listings database using the trained adaptive learning algorithm.

Figure 17:
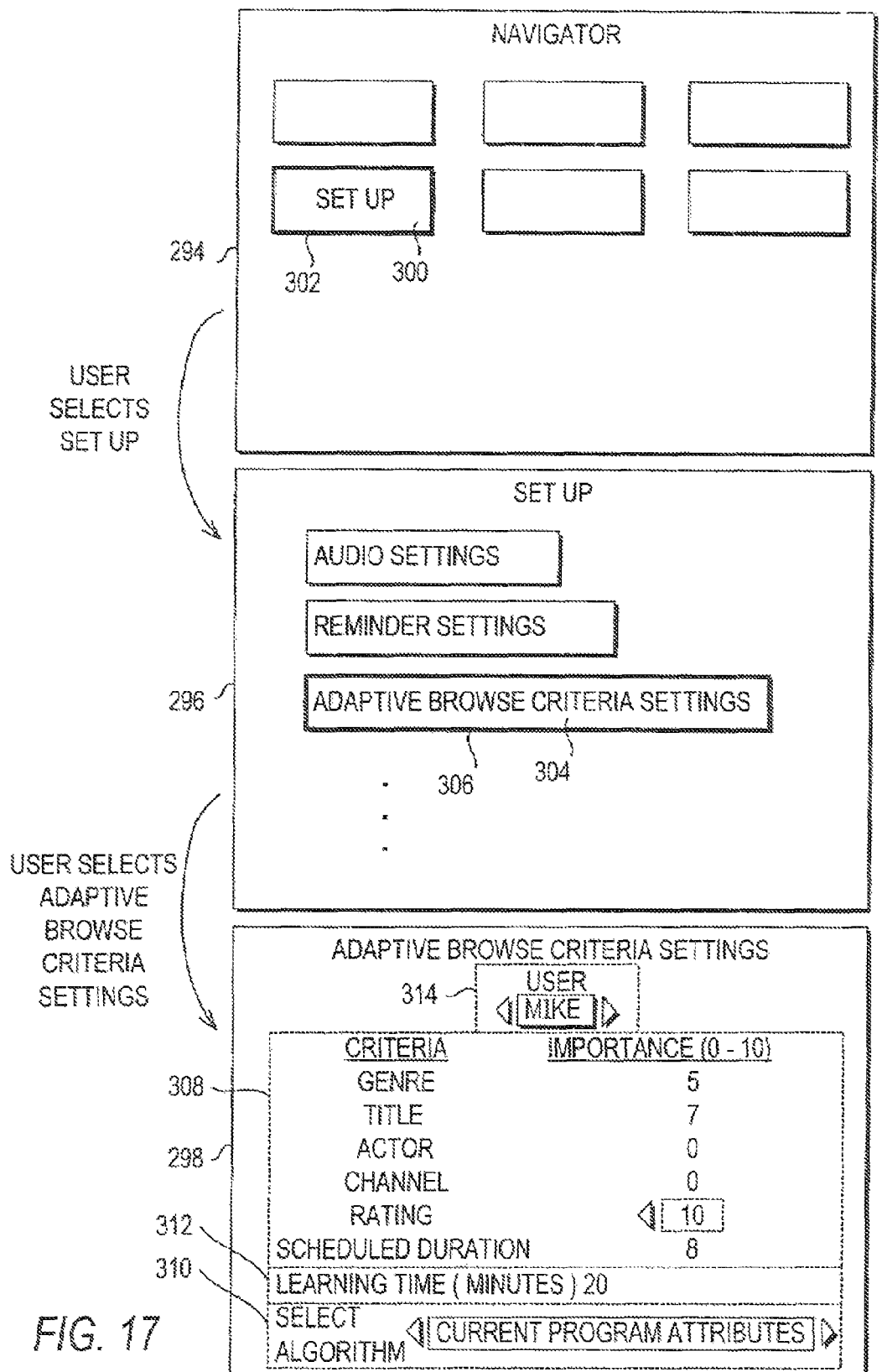
FIG. 17 is a diagram of an illustrative navigator display screen, a setup display screen that may be provided when Asetup@ is selected, and an adaptive browse criteria settings display screen in accordance with the present invention.

As shown in FIG. 17, the program guide of the present invention may display illustrative navigator display screen 294, illustrative setup display screen 296, and illustrative adaptive browse criteria settings display screen 298. Navigator display screen may include setup option 300. Setup option 300 may be selected by positioning highlight window 302 on setup option 300 and pressing an OK key on a remote control.

Setup display screen 296 may be displayed when a user selects setup option 300. Setup display screen 296 may include adaptive browse criteria settings option 304 among other user-selectable options. Adaptive browse criteria settings option 304 may be selected by positioning highlight window 306 on adaptive browse criteria settings option 304 and pressing an OK key.

Adaptive browse criteria settings display screen 298 may be displayed when a user selects adaptive browse criteria setting option 304. Adaptive browse criteria settings display screen 298 may include select algorithm option 310. Select algorithm option 310 may provide an opportunity to select as the algorithm to be used in building a list of programs an algorithm based on (for example): (a) current program attributes, (b) last-viewed program attributes, or (c) attributes determined using an adaptive learning algorithm. The user may use option 310 to select one of these three types of algorithms. When the selected algorithm is set to current program attributes or last displayed program attributes, adaptive browse criteria settings display screen 298 may include criteria settings display region 308. Criteria setting display region 308 may include a list of program attribute criteria (e.g., genre, title, actor, channel, rating, scheduled duration, etc.) and adjustable importance settings (weights) associated with each criteria. Importance settings may be modified using a remote control or other suitable user input interface (e.g., track ball).

Adaptive browse criteria settings display screen 298 may include learning time option 312. Learning time option 312 may be used to set the minimum viewing duration of a current or last-viewed program before the attributes of the program may be used to build a list of programs. A user may have the opportunity to override the minimum viewing duration by selecting option 133 of FIG. 3 for manually selecting the current program for building a list of programs without waiting the minimum viewing duration. When building a list of programs matching the attributes of a current or last-viewed program, a program=s attributes may be compared to attributes associated with program listings in a program listings database (e.g., program listings database 64) and may be weighted using the importance settings.

Adaptive browse criteria settings display screen 298 may include user identification option 314 for associating different adaptive browse criteria settings with each user in a household. User identification option 314 may identify the displayed settings to be associated with user Mike. User identification option 314 may be selected to scan through a list of users.

Figure 18:
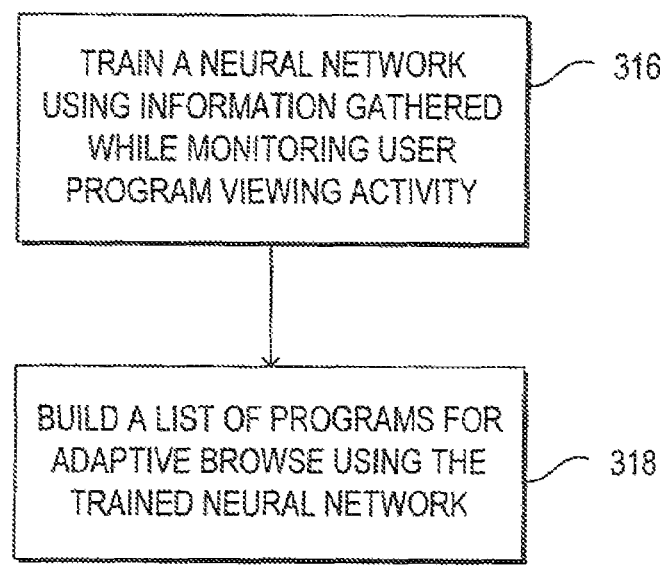
FIG. 18 is a flow chart of illustrative steps involved in providing a list of programs using an adaptive learning algorithm in accordance with the present invention.

Illustrative steps involved in using a training algorithm to determine which adaptive browse program listings have attributes similar to viewed programming are shown in FIG. 18. At step 316, the program guide may train a neural network (for example) using information gathered while monitoring user program viewing activity. This information may include program related parameters that can be tagged to a program such as genre of viewed programs, actors of viewed programs, title of viewed programs, scheduled length of viewed programs, rating of viewed programs, percentages of the lengths of the programs view, etc. At step 318, the program guide may build a list of programs for the adaptive browse display using the trained neural network (e.g., by applying attributes associated with each program listing to the trained neural network to obtain an indication of a likelihood of user interest in that program).

Figure 19:
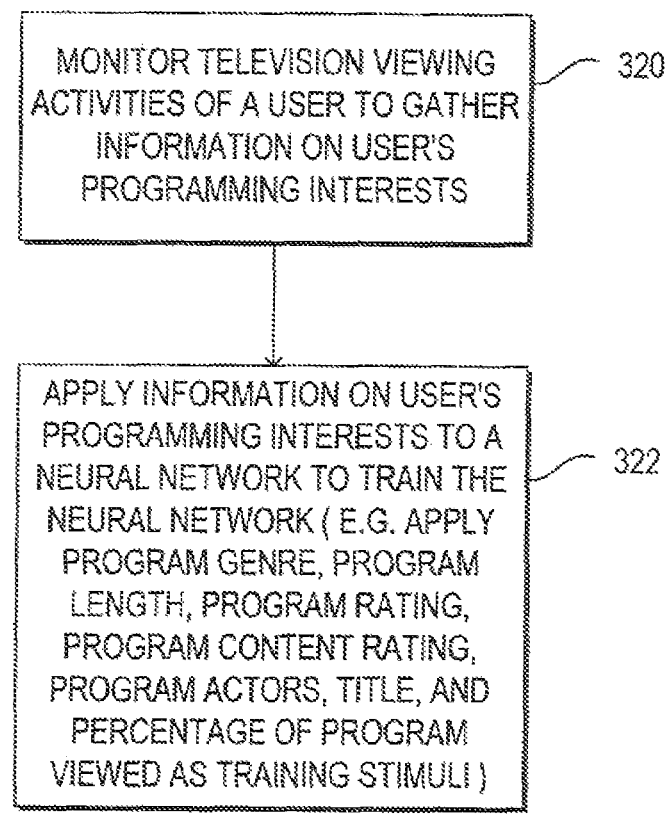
FIG. 19 is a flow chart of illustrative steps involved in providing a trained neural network in accordance with the present invention.

Illustrative steps involved in training a neural network such as at step 316 of FIG. 18 are shown in more detail in FIG. 19. At step 320, the program guide (or other application) may monitor the television viewing activities of a user to gather information on the user=s programming interests. At step 322, the program guide (or other application) may apply the information on the programming interests of the user to a neural network to train the neural network. The information on the programming interests may include program related parameters that can be tagged to a program such as program genre, program length, program rating, program content rating, program actors, and title, and may also involve data on the percentage of programs viewed. This information may be used as training stimuli for the neural network.

Figure 20:
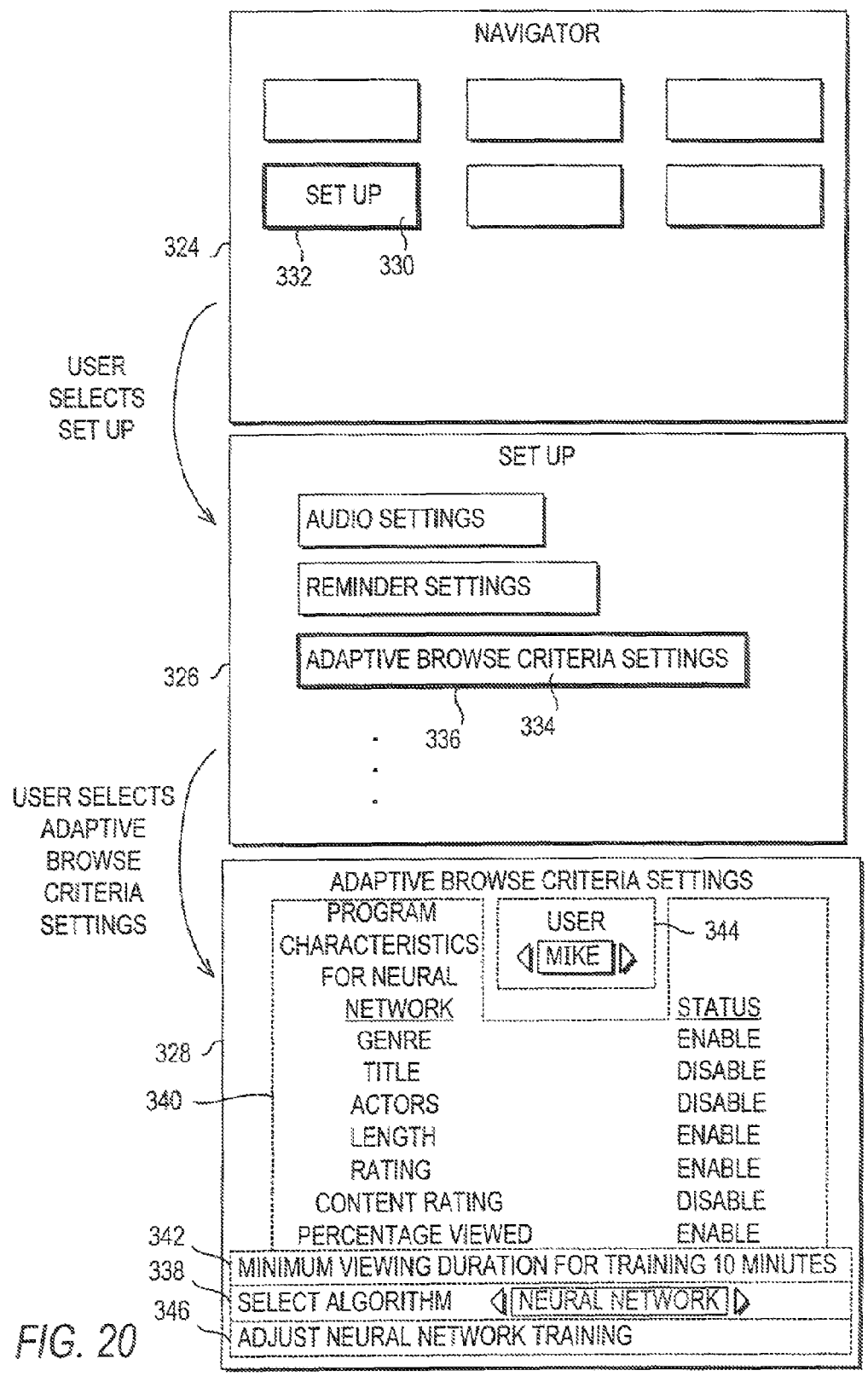
FIG. 20 is a diagram of an illustrative navigator display screen, a setup display screen that may be provided when Asetup@ is selected, and an adaptive browse criteria settings display screen in accordance with the present invention.

As shown in FIG. 20, if the program guide (or other application) of the present invention uses a neural network, it may display illustrative navigator display screen 324, illustrative setup display screen 326, and illustrative adaptive browse criteria settings display screen 328. Navigator display screen 324 may include setup option 330. Setup option 330 may be selected by positioning highlight window 332 on setup option 330 and pressing a remote control OK key. Setup display screen 326 may be displayed when a user selects setup option 330. Setup display screen 326 may include adaptive browse criteria settings option 334 and other user-selectable options. Adaptive browse criteria settings option 334 may be selected by positioning highlight window 336 on adaptive browse criteria settings option 334 and pressing an OK key.

Adaptive browse criteria settings display screen 328 may be displayed when a user selects adaptive browse criteria setting option 334. Adaptive browse criteria settings display screen 328 may include select algorithm option 338. Select algorithm option 338 may provide an opportunity to select the algorithm to be used in building a list of programs using current displayed program attributes, last displayed program attributes, or a neural network. When the selected algorithm is the neural network algorithm as shown in FIG. 20, adaptive browse criteria settings display screen 328 may include neural network criteria setting display region 340. Criteria setting display region 340 may include a list of selectable options related to user viewing activity. These may include program attributes such as genre, title, actor, channel, rating, and scheduled duration, and other criteria such as percentage of program viewed, etc. Criteria setting display region 340 may include status settings associated with each characteristic. Status settings may be set to be either enabled or disabled. When a status setting is set to be enabled, the characteristic associated with the status setting may be used in the neural network.

Adaptive browse criteria settings display screen 328 may include learning time option 342. Learning time option 342 may be used to set the minimum viewing duration of a program before the program related characteristics are used in training the neural network. The user may have the opportunity to override the minimum viewing duration by selecting option 133 of FIG. 3 for manually selecting the current program for training the neural network without waiting the minimum viewing duration. To build a list of programs, program attributes, and the characteristics of viewed programs are applied to the neural network to train the neural network. Subsequently, the characteristics of various current and future programs may be applied to the trained neural network. The resulting output of the trained network provides an indicator of the likelihood of user interest in those programs.

Adaptive browse criteria settings display screen 328 may include user identification option 344 for associating different settings with each user. User identification option 344 may identify the displayed settings to be associated with user Mike. A user may select user identification option 344 and scan through a list of users. In addition, user identification portion 344 may be used to log in a user to commence training the neural network based on the programs that are viewed by the user. A user may alternatively log in from a separate log-in display screen, a set-up menu, etc.

Figure 21:
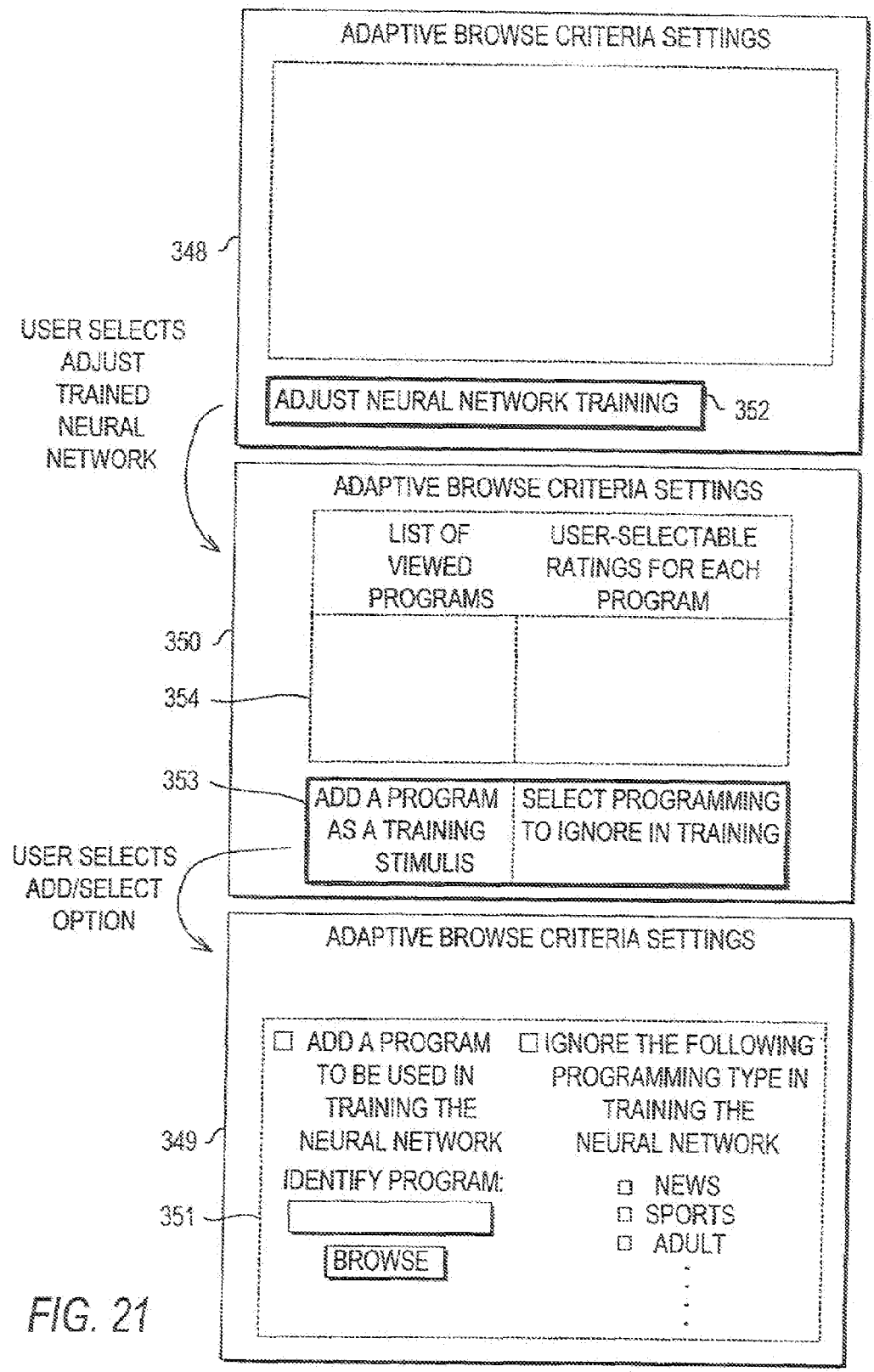
FIG. 21 is a diagram of an illustrative adaptive browse criteria settings display screen that may include a user-selectable adjust trained neural network portion, an adaptive browse criteria settings display screen that may be provided when the adjust trained neural network option is selected, and an adaptive browse criteria settings display screen that may be provided when an add/select option is selected in accordance with the present invention.

Another way in which users may adjust the network is shown in FIG. 21. As shown in FIG. 21, the program guide of the present invention may display illustrative adaptive browse criteria display screen 348 and illustrative adaptive browse criteria settings display screen 350. Adaptive browse criteria settings display screen 348 may include adjust neural network training option 352. Adjust neural network training option 352 may be selected by positioning a highlight window on adjust neural network training option 352 and pressing an OK key. In response, adaptive browse criteria settings display screen 350, which has adjustment option 354, may be displayed. Adjustment option 354 may include a list of programs viewed by a user and a rating associated with each program on the list. Each rating may be set or adjusted by a user to fine tune the performance of the trained neural network. Adaptive browse criteria setting display screen 350 may include add/select option 353 for adding a program as a training stimulus or selecting to ignore certain programming in training the neural network (e.g., news, sports, etc.). When a user selects add/select option 353, adaptive browse criteria setting display screen 349 may be displayed. Display screen 349 may include add/select region 351 which provides the user with an opportunity to identify a program to be used in training the neural network or to select types of programs to ignore in training the neural network.

The foregoing discussion has focused on the use of adaptive browse displays, which allows a user to browse suggested program listings on channels and at times other than the time and channel of the current program being watched while still displaying the current program. Another aspect of the invention relates to adaptive flip displays in which the user is presented with suggested listings while changing channels.

Figure 22:
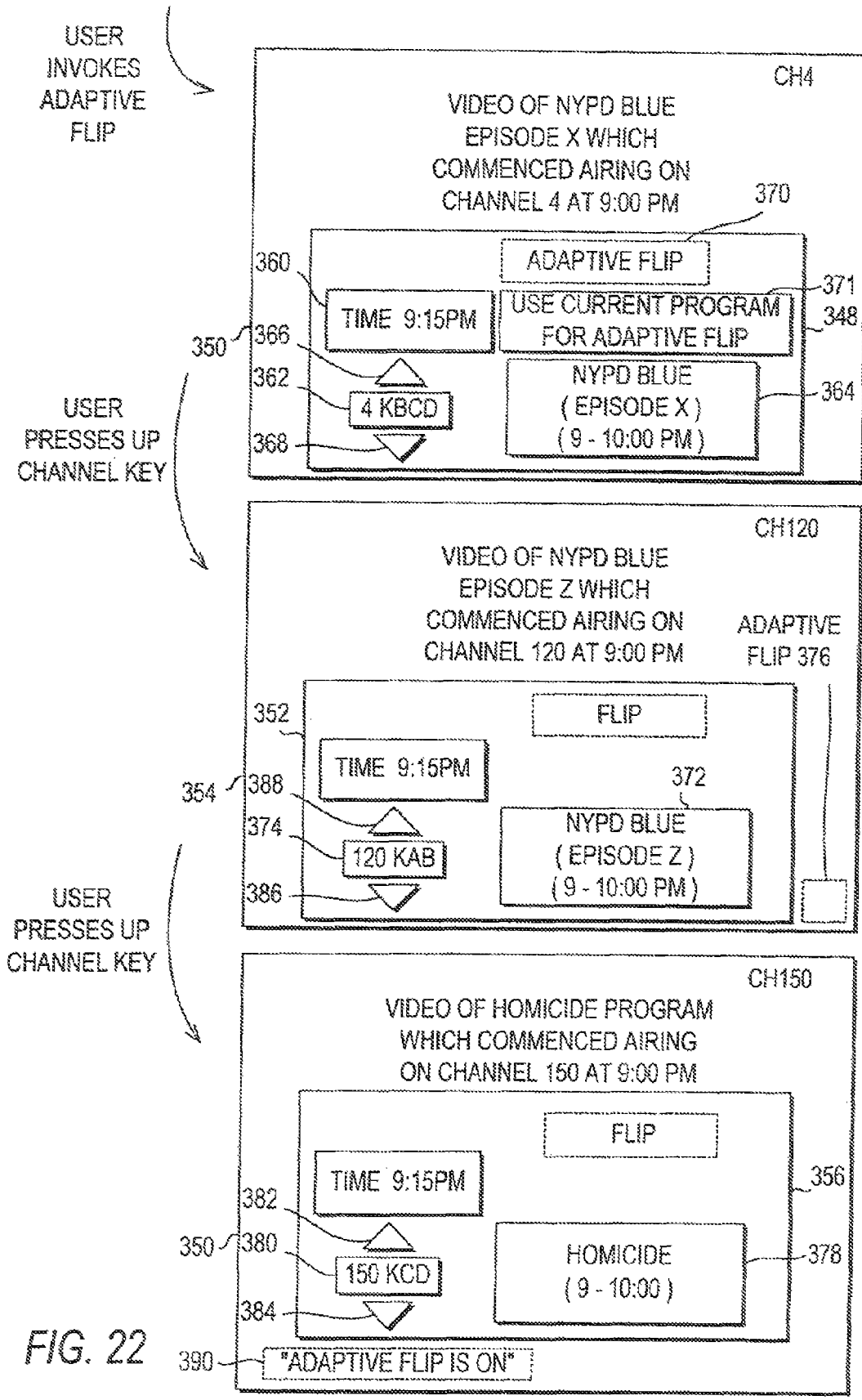
FIG. 22 is a diagram illustrating an adaptive flip display region on a television screen, a corresponding adaptive flip display region on a television screen that may be provided when a channel-up key of a remote control is pressed, and an adaptive flip display screen that may be provided when the channel-up key of the remote control is pressed again in accordance with the present invention.

As shown in FIG. 22, the program guide of the present invention may display adaptive flip display region 348 on illustrative television screen 350, illustrative adaptive flip display region 352 on illustrative television screen 354, and illustrative adaptive flip display region 356 on illustrative television screen 358. Adaptive flip display region 348 may be displayed on television screen 350 when a user presses an adaptive flip function key of a remote control (e.g., adaptive flip function key 100 of FIG. 2). Television screen 350 may include video of a program airing on the channel currently tuned to and being watched when adaptive flip display region 348 is invoked. Television screen 350 may include video of episode AX@ of NYPD Blue which commenced airing on channel 4 at 9:00 PM and which was being watched when adaptive flip display region 348 was invoked. If desired, the adaptive flip feature may be invoked when the user starts changing channels, in which case the first channel displayed is other than the channel that was being watched when the flip mode was invoked.

Adaptive flip display region 348 may include time portion 360, channel identification portion 362, program information portion 364, up-direction portion 366, down-direction portion 368, on-screen confirmation portion 370, and option 371 for selecting the current program for determining programs for adaptive flip.

Channel identification portion 362 may include an identification of a channel. In flip mode, channel identification portion 362 includes an identification of the currently tuned channel. Program information portion 364 may include information on a program airing on the currently tuned channel. Time portion 360 may include an indication of the current time. Up-direction portion 366 and down-direction portion 368 may include direction arrows indicating that the user may change channels in either the up or down direction. On-screen confirmation portion 370 may provide a confirmation that the flip feature has been invoked. In addition, on-screen confirmation 370 may also provide a confirmation that the flip feature is in adaptive mode (i.e., that the adaptive flip feature has been enabled). This allows the user to toggle between adaptive flip mode and regular flip mode if desired. The user may also toggle between adaptive browse mode and regular browse mode if desired.

When the user presses an up-channel key, the system locates a viewing suggestion on the nearest adjacent channel in the up direction and tunes to that channel. If the user selects Ause current program for adaptive flip@ option 371, attributes of the current program, Episode X of NYPD Blue, may be used in determining viewing suggestions for the user. Adaptive flip display region 352 may be displayed, the channel identified in adaptive flip display region 352 may be updated, and video of the program airing on the new channel may be displayed. Adaptive flip display region 352 may include program information portion 372. Program information portion 372 may include information on a program airing on the currently tuned channel, episode AZ@ of NYPD Blue. The program, episode AZ@ of NYPD Blue, is a viewing suggestion determined based on the user=s programming interests as determined by the user=s viewing activity. Program information portion 372 may include the scheduled time and duration of episode AZ@ of NYPD Blue. Channel identification portion 374 of adaptive flip display region 352 may include an identification of the channel, KAB channel 120, that is associated with episode AZ@ of NYPD Blue.

Television screen 354 may include video of episode AZ@ of NYPD Blue currently airing on KAB channel 120. Up-direction portion 388 and down-direction portion 386 may indicate that the user may change channels in either the up or down directions.

Television screen 354 may include on-screen confirmation portion 376. On-screen confirmation portion 376 may be in the form of an icon providing an alternative form of on-screen confirmation for adaptive mode. On-screen confirmations such as on-screen confirmation portion 370, on-screen confirmation portion 376, or any other such suitable indicator may be used in combination or separately and may be presented on any suitable display screens when appropriate.

If the user is interested in tuning to the channels for additional suggested current programs, the user may again press the up-channel key. This causes the system to tune to the channel for another suggested program. Adaptive flip display region 356 may then be displayed, the channel identified in adaptive flip display region 356 may be updated, and video of the program airing on the new channel may be displayed.

Adaptive flip display region 356 may include program information portion 378. Program information portion 378 may include information on a suggested program, Homicide, airing on the new channel to which the user television equipment is current tuned. The program, Homicide, is a viewing suggestion for the current time window based on the user=s programming interests as determined based on the user=s viewing activity. Program information portion 378 may include the scheduled time and duration of the suggested program. Channel identification portion 380 of adaptive flip display region 356 may include an identification of the channel, KCD channel 150, associated with the suggested program (Homicide).

Television screen 358 may include video of Homicide currently airing on KCD channel 150. Program suggestions for the adaptive flip feature may be based on the same types of criteria used when making program suggestions for the adaptive browse feature. In particular, the system may monitor the user=s viewing activity to determine user=s programming interests based on the program the user is currently viewing, the last program viewed, or the user=s general viewing habits. Suggested programs may be identified by comparing the program attributes (genre, title, actors, rating, etc.) of the user=s programming interests with the program listings database to locate matches.

Television screen 358 may include on-screen confirmation portion 390. On-screen confirmation portion 390 may be in the form of text or other suitable form of on-screen confirmation of the adaptive mode.

Figure 23:
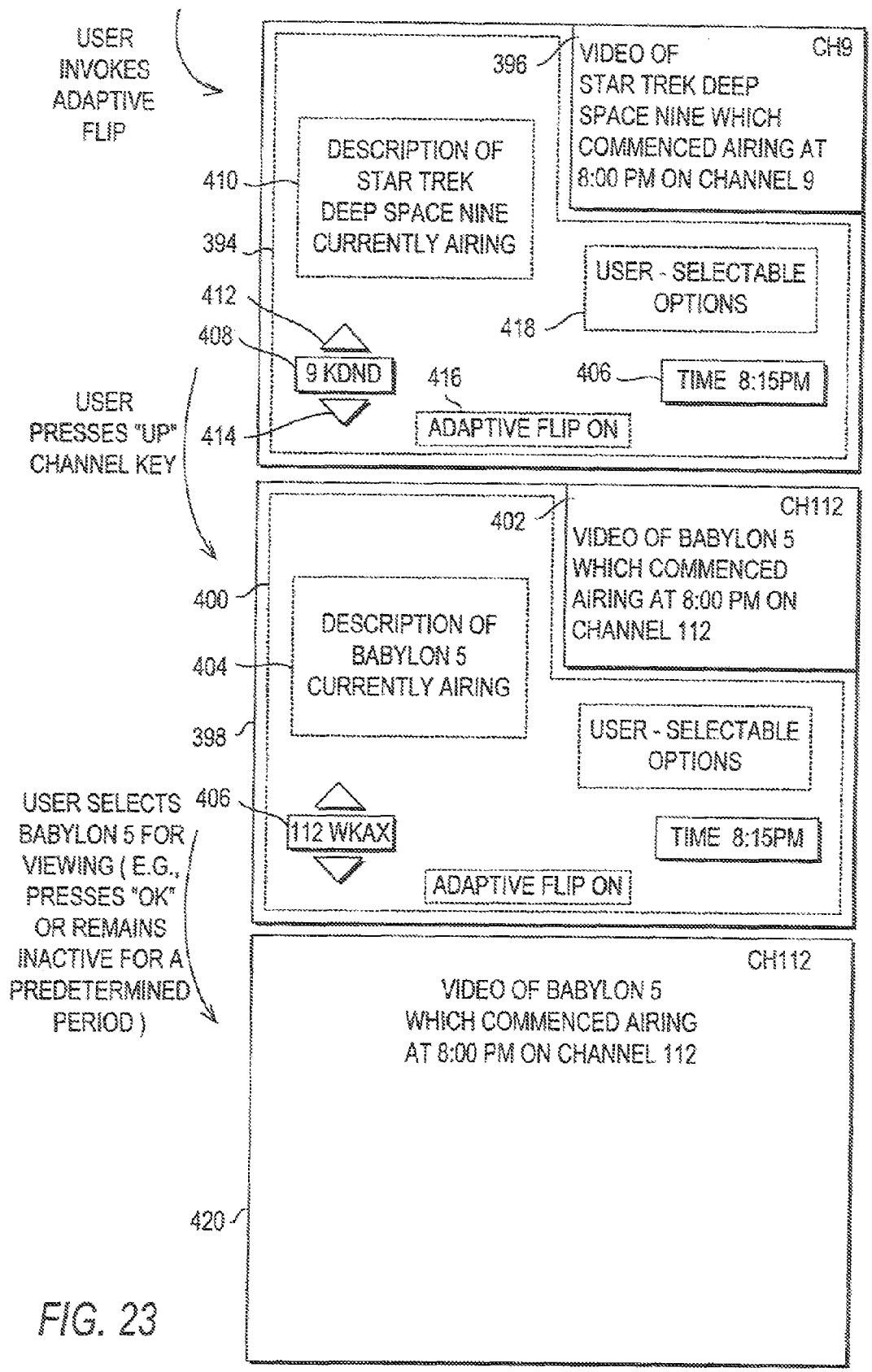
FIG. 23 is a diagram illustrating an adaptive flip display screen having an adaptive flip display region with a compressed video display region, an adaptive flip display screen having an adaptive flip display region and a compressed video display region that may be provided when an a channel-up key of the remote control is pressed, and a television screen that may be provided when a program is selected for viewing in accordance with the present invention.

If desired, the adaptive flip feature may be provided in a configuration in which the current program is shown in a reduced size video window. As shown in FIG. 23, the program guide of the present invention may display illustrative television screen 392 having illustrative adaptive flip display region 394 and illustrative video display region 396, illustrative television screen 398 having illustrative adaptive flip display region 400 and illustrative video display region 402, and illustrative television screen 420. Video display region 396 of television screen 392 may include a reduced-size video of a program airing on the channel currently tuned to and being watched when adaptive flip display region 394 was invoked. Adaptive flip display regions such as adaptive flip display region 394 typically have room for more information or options than adaptive flip display regions such as adaptive flip display region 348 of FIG. 22. Adaptive flip display region 394 may include time portion 406, channel identification portion 408, program information portion 410, up-direction portion 412, down-direction portion 414, and on-screen confirmation portion 416, and user-selectable options portion 418.

When the adaptive flip feature is invoked, channel identification portion 408 includes an identification of the currently tuned channel. Program information portion 410 includes information on the program airing on the channel identified in channel identification portion 408 (e.g., Star Trek Deep Space Nine on KDND channel 9). The channel listed in channel identification portion 408 is the same channel that is displayed in video display region 396. Time portion 406 may include an indication of the current time. Up-direction portion 412 and down-direction portion 414 may include direction arrows indicating up and down channel flip availability.

On-screen confirmation portion 416 may provide a confirmation that the adaptive flip feature has been activated. If the program guide supports both a regular flip feature (that tunes all channels) and an adaptive flip feature, on-screen confirmation 416 may provide a confirmation when the flip feature is in adaptive mode. User-selectable options portion 418 may include user-selectable program guide options. Such options may allow the user to set parental controls, set favorites, etc.

Television screen 398 having an adaptive flip display region 400 and video display region 402 may be displayed when the user presses an up-navigation key of a remote control while adaptive flip display region 394 is displayed. Adaptive flip display region 400 may include program information portion 404. Program information portion 404 may include information on a suggested program (Babylon 5) for a viewing in the current time window. The program, Babylon 5, may be identified as a viewing suggestion based on the user=s viewing activity. Program information portion 404 may include the scheduled time and duration of the program.

Channel identification portion 406 of adaptive flip display region 398 may include an identification of the channel, WKAX channel 112, associated with the program, Babylon 5. Simultaneous to displaying adaptive flip display region 400, the system tunes to the channel associated with the program (KAB channel 120) and displays the program in video display region 402. The program may be displayed as a reduced size video. Up-direction portion 388 and down-direction portion 386 may be used to indicate availability of the flip feature in the up and down directions.

If the user presses the OK key while adaptive flip display region 400 is being displayed, the system will remove adaptive flip display region 400 and display the suggested program on a full television screen (television screen 420 in the example of FIG. 23). If desired, the suggested program may be displayed in this way when the user presses a remote control exit key of a remote control, does not take an action for a predetermined period of time, or otherwise indicates an interest in full-screen viewing. Television screen 420 may include normal-aspect-ratio video of the suggested program, Babylon 5, airing on the currently tuned channel.

Figure 24:
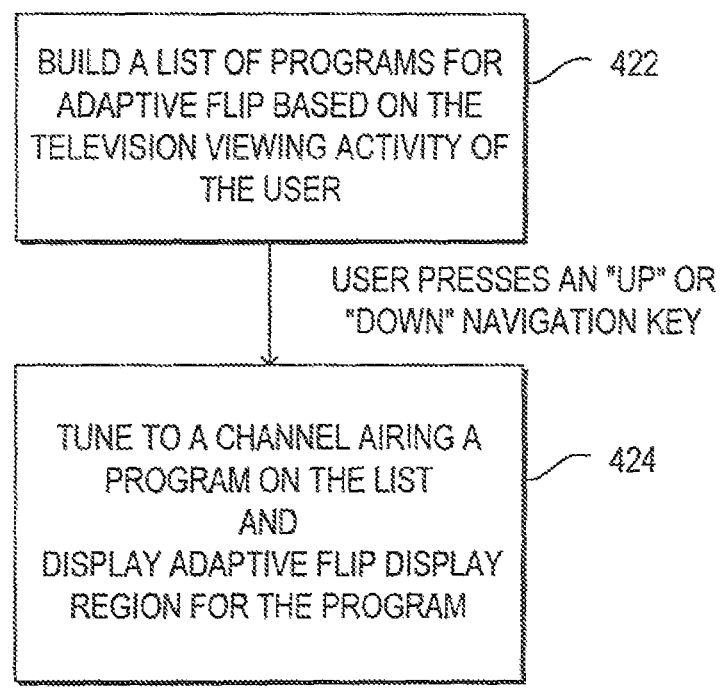
FIG. 24 is a flow chart of illustrative steps involved in providing an adaptive flip feature in accordance with the present invention.

Illustrative steps involved in providing an adaptive flip feature such as the adaptive flip features illustratively shown in FIG. 22 and FIG. 23 are shown in FIG. 24. At step 422, a list of suggested programs may be built for adaptive flip based on the television viewing activity of the user. The list of programs may be built from information stored in a program listings database (e.g., program listings database 64 of FIG. 24). When a user presses an up or down channel key (such as keys 92 or 94 in FIG. 2), the system tunes to the next channel on which one of the suggested programs appears and displays the adaptive flip display (step 424). For example, if the user presses the up channel key, the system tunes to the next highest channel on which a suggested program on the list is being displayed. Intervening channels that contain non-suggested programs are skipped.

Figure 25:
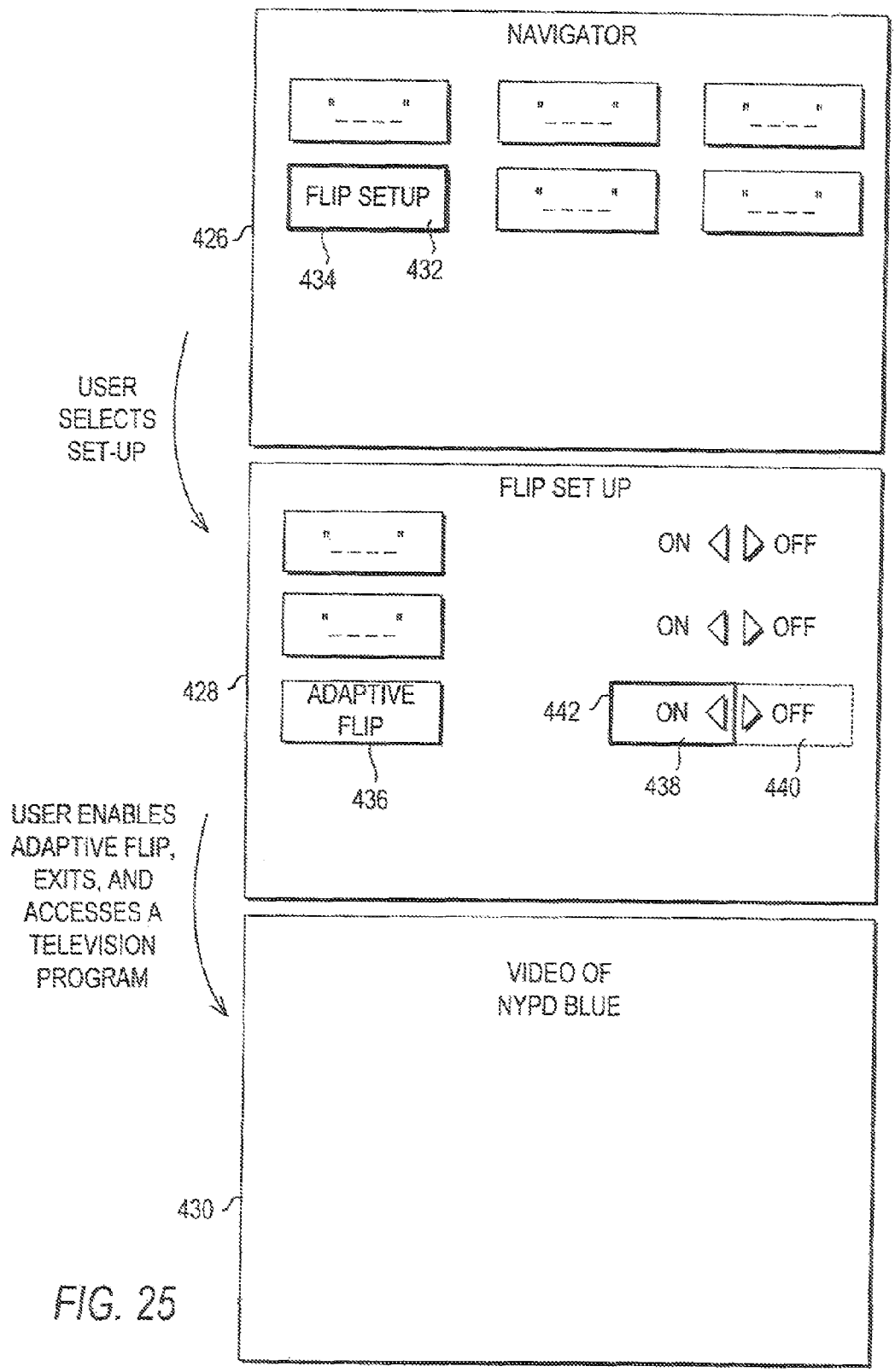
FIG. 25 is a diagram illustrating a navigator display screen, a flip setup display screen that may be provided when flip setup is selected, and a television screen that may be displayed after the flip setup display screen is exited in accordance with the present invention.

As shown in FIG. 25, the program guide of the present invention may allow the user to adjust flip settings. The program guide may display illustrative navigator display screen 426, illustrative flip setup display screen 428, and illustrative television screen 430. Navigator display screen 426 may include flip setup option 432. Flip setup option 432 may be selected by positioning highlight window 434 on flip setup option 432 and pressing an OK key. Flip setup display screen 428 may be displayed when a user selects flip setup option 432. Flip setup display screen 428 may include adaptive flip option 436 and may include Aon@ and Aoff@ portions 438 and 440 associated with adaptive flip option 436. Positioning highlight flip 442 on Aon@ portion 438 may place the program guide flip feature in adaptive mode (i.e., selecting AON@ enables the adaptive flip feature). Subsequently, flip setup display screen 428 may be exited and television screen 430 may be displayed. When the user presses an up or down channel key to activate flip, the program guide automatically activates the adaptive flip feature.

Figure 26:
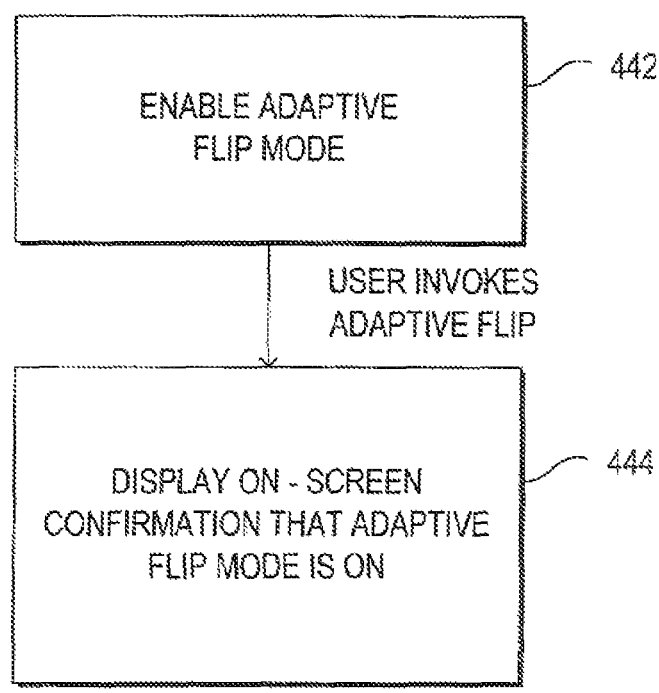
FIG. 26 is flow chart of illustrative steps involved in providing an on-screen confirmation of adaptive flip mode in accordance with the present invention.

Illustrative steps involved in providing an on-screen confirmation of an adaptive flip feature such as on-screen adaptive flip confirmation portion 370 of FIG. 22 are shown in FIG. 26. At step 442, adaptive flip mode may be enabled for example by pressing a function key, selecting an option from a browse setup display screen, pressing a dedicated button on a set-top box, etc. At step 444, on-screen confirmation of adaptive flip mode may be displayed. On-screen confirmation may be displayed at step 444 when a user invokes adaptive flip. A user may invoke adaptive flip by pressing an up or down channel key, by pressing and holding an up or down channel key for a period of time, by pressing a remote control adaptive flip function key followed by an up or down channel key, etc. For the flip (or the browse) feature, if the user presses an adaptive flip (or browse) function key just prior to previously using the adaptive flip (or browse) feature, the user need not have enabled the adaptive flip (or browse) mode. If the user invokes the adaptive function by pressing a channel up or down key or other such technique, and if the program guide (or other application) supports both a regular flip (or browse) function and an adaptive flip (or browse) function, then the user may be provided with an opportunity to toggle between regular flip and browse mode (adaptive flip or browse is disabled) and adaptive flip or browse mode (adaptive flip or browse is enabled).

Figure 27:
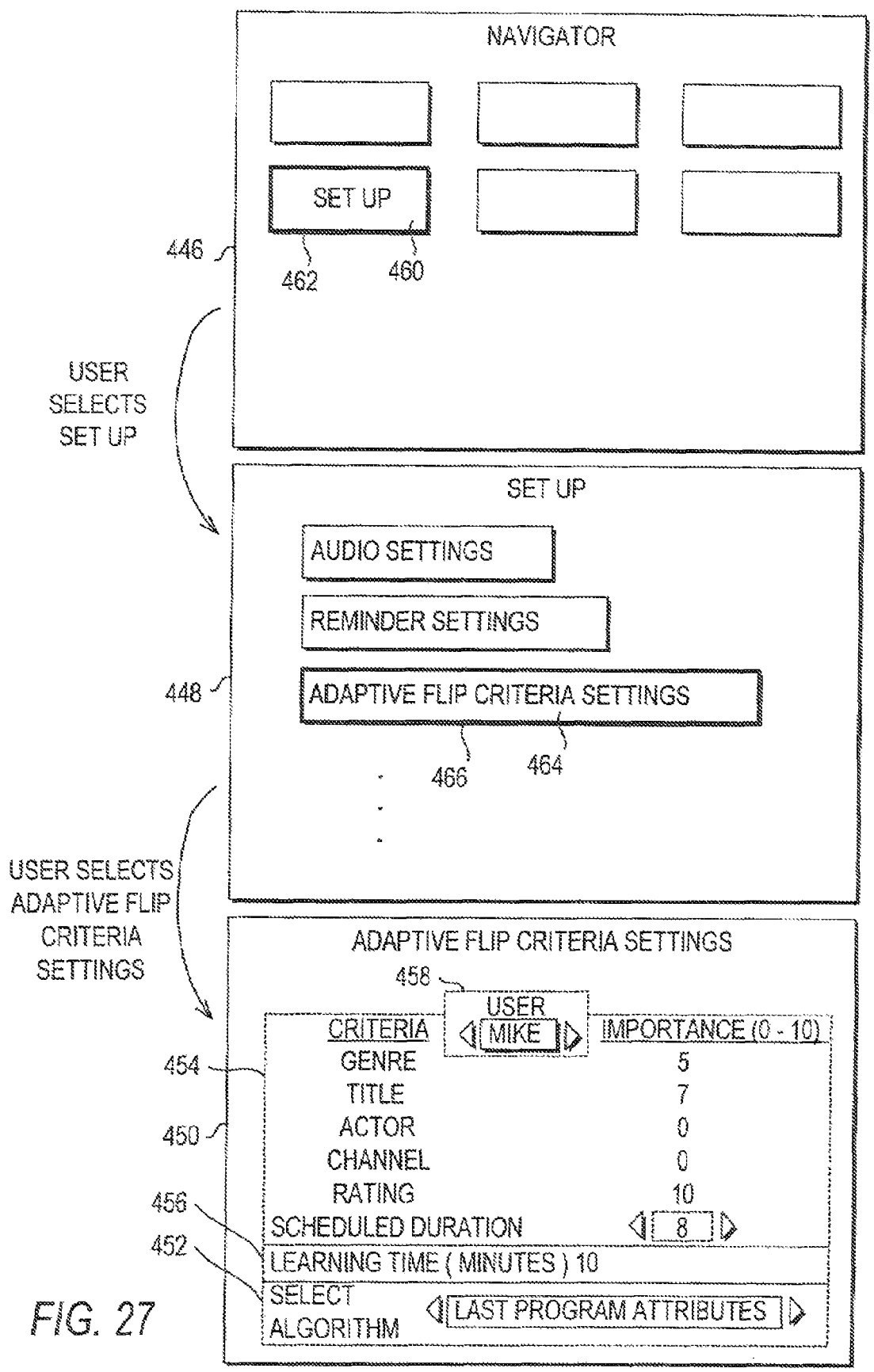
FIG. 27 is a diagram of an illustrative navigator display screen, a setup display screen that may be provided when Asetup@ is selected, and an adaptive flip criteria settings display screen in accordance with the present invention.

As shown in FIG. 27, the program guide of the present invention may display illustrative navigator display screen 446, illustrative setup display screen 448, and illustrative adaptive flip criteria settings display screen 450. Navigator display screen 446 may include setup option 460. Setup option 460 may be selected by positioning highlight region 462 on setup option 460 and pressing an OK key. Setup display screen 448 may be displayed when the user selects setup option 460. Setup display screen 448 may include adaptive flip criteria settings option 464 and other user-selectable options. Adaptive flip criteria settings option 464 may be selected by positioning highlight region 466 on adaptive flip criteria settings option 464 and pressing an OK key.

Adaptive flip criteria settings display screen 450 may be displayed when a user selects adaptive flip criteria settings option 464. Adaptive flip criteria settings display screen 450 may include select algorithm option 452. Select algorithm option 452 may provide the user with an opportunity to select the algorithm to be used in building the list of suggested programs for the adaptive flip feature using current program attributes, using last displayed program attributes, or using an adaptive learning algorithm.

When the selected algorithm is current program attributes or last displayed program attributes, adaptive flip criteria settings display screen 450 may include criteria setting display region 454. Criteria setting display region 454 may include a list of program attribute criteria (e.g., genre, title, actor, channel, rating, scheduled duration, etc.) and may include adjustable importance settings associated with each program attribute criteria. Importance settings may be modified by the user using a remote control or other suitable form of data entry.

Adaptive flip criteria settings display screen 450 may also include learning time option 456. Learning time option 456 may be used to set the minimum viewing duration for the current or last-viewed program after which the attributes of the program are used to build the list of suggested programs. A user may have the opportunity to override the minimum viewing duration by selecting option 371 of FIG. 22 for manually selecting the current program for building a list of programs without waiting the minimum viewing duration. To build the list of suggested programs, attributes of the currently viewed or last-viewed program may be weighted using the importance settings.

The resulting weighted attributes may be compared to attributes associated with program listings in a program listings database (e.g., program listings database 64). The program listings with attributes that most closely match the weighted attributes are used as program suggestions.

Adaptive flip criteria settings display screen 450 may include user identification option 458 for associating different adaptive flip criteria settings with each user. User identification option 458 may identify the displayed settings to be associated with user Mike. User identification option 458 may be selected by the user, so that the user may scan through a list of users. Later, when a given user is using the program guide (or other application), the user may direct the system to use that user=s settings (including that user=s adaptive flip and adaptive browse criteria settings).

Figure 28:
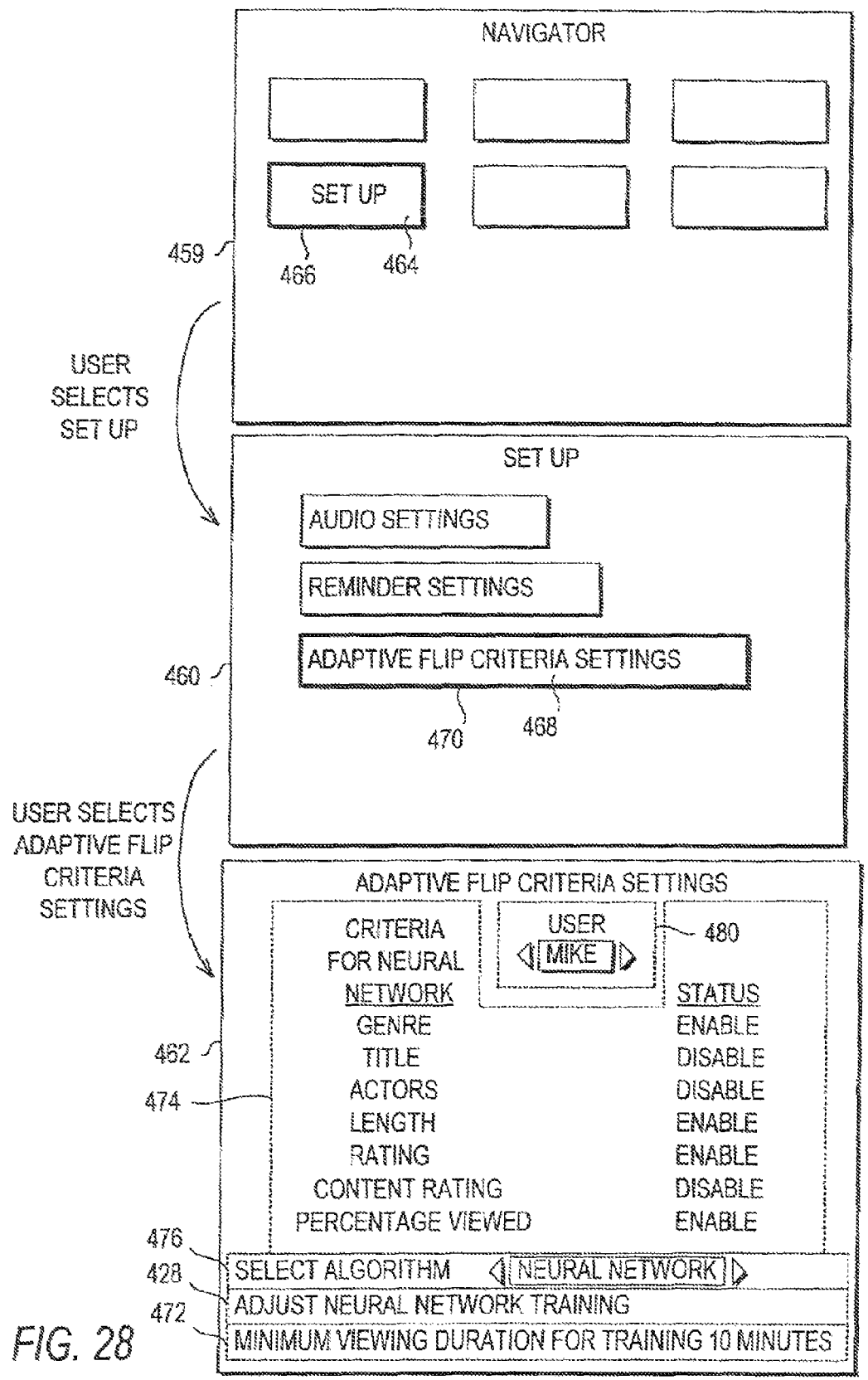
FIG. 28 is a diagram illustrating a navigator display screen, a setup display screen that may be provided when Asetup@ is selected, and an adaptive flip criteria settings display screen in accordance with the present invention.

As shown in FIG. 28, the program guide of the present invention may display illustrative navigator display screen 459, illustrative setup display screen 460, and illustrative adaptive flip criteria settings display screen 463. Navigator display screen 459 may include setup option 464. Setup option 464 may be selected by positioning highlight region 466 on setup option 464 and pressing an OK key. Setup display screen 460 may be displayed when a user selects setup option 464. Setup display screen 460 may include adaptive flip criteria settings option 468 and other user-selectable options. Adaptive flip criteria settings option 468 may be selected by positioning highlight region 470 on adaptive flip criteria settings option 468 and pressing an OK key.

Adaptive flip criteria settings display screen 462 may be displayed when a user selects adaptive flip criteria settings option 460. Adaptive flip criteria settings display screen 462 may include select algorithm option 476. Select algorithm option 476 may provide an opportunity for the user to select the algorithm to be used to building the list of suggested programs for the adaptive browse feature using current program attributes, last displayed program attributes, or a neural network. When the selected algorithm is the neural network algorithm, adaptive browse criteria settings display screen 462 may include neural network criteria setting display option 474. Criteria setting display option 474 may include a list of program attributes (e.g., genre, title, actor, channel, rating, scheduled duration, etc.), other criteria such as percentage of program viewed, and status settings associated with each criteria. The list of program attributes may also include other related parameters that can be tagged to a program. Status settings may be set to be either enabled or disabled. A listed criteria may be used in a neural network when the associated status setting is set to enabled.

Adaptive flip criteria settings display screen 462 may also include learning time option 472. Learning time option 472 may be used to set the minimum time that a program must be viewed before the program-related criteria may be used for training the neural network. The user may have the opportunity to override the minimum viewing duration by selecting option 371 of FIG. 22 for manually selecting the current program for training the neural network without waiting the minimum viewing duration. Criteria of viewed programs may be applied to a neural network to train the neural network. To build a list of suggested programs, the program attributes of various current and future programs may be applied to the trained neural network to provide an indicator of a likelihood of user interest in each of these programs.

Adaptive browse criteria settings display screen 462 may include user identification option 480 for associating a different settings with users. For example, user identification option 480 may identify the displayed settings as being associated with user Mike. User identification option 480 may be used to scan through a list of program guide users. This allows the settings for any desired user to be changed.

Figure 29:
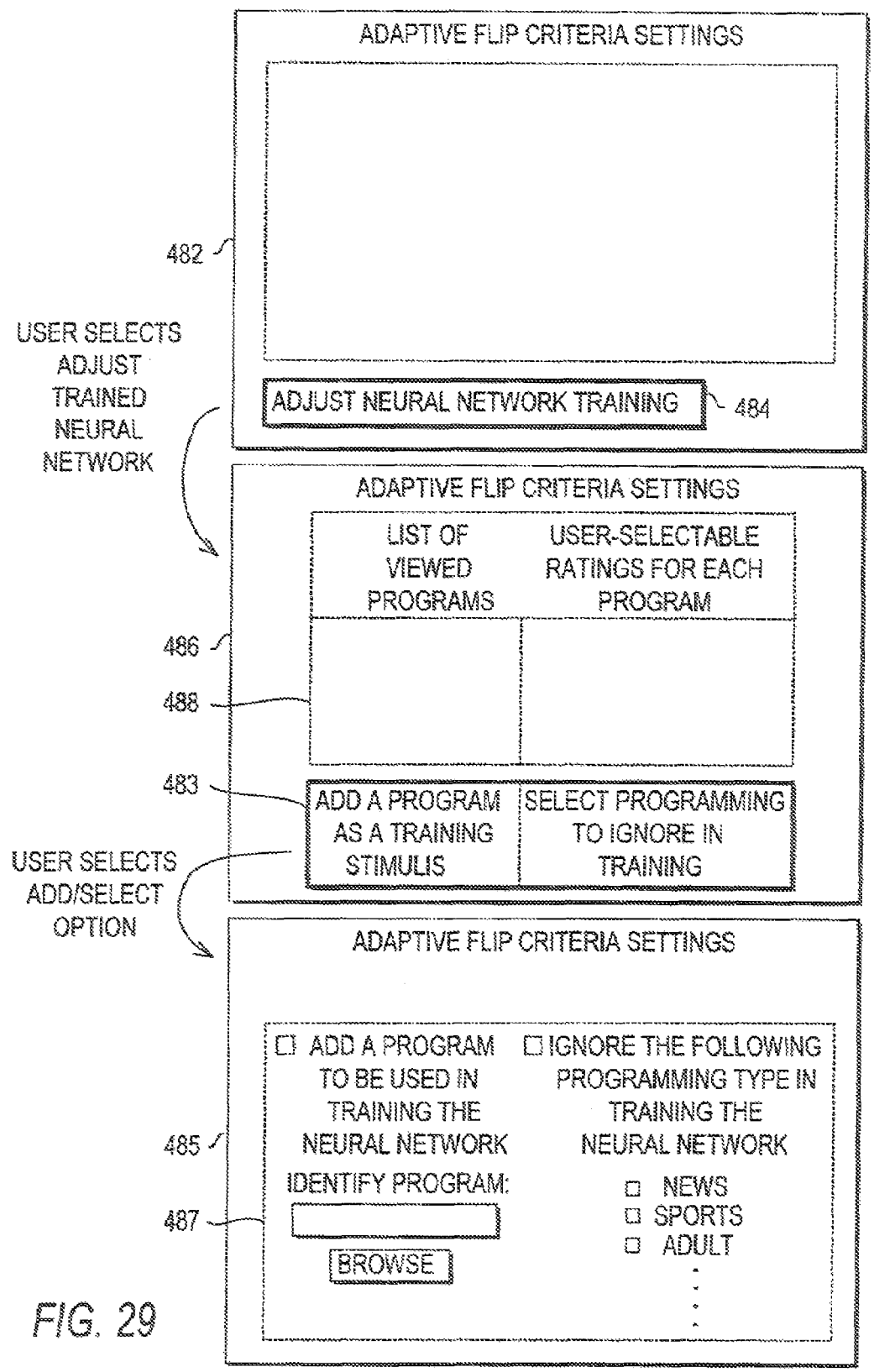
FIG. 29 is a diagram illustrating an adaptive flip criteria settings display screen that may include a user-selectable adjust trained neural network option, an adaptive flip criteria settings display screen that may be provided when the adjust trained neural network option is selected, and an adaptive flip criteria settings display screen that may be provided when an add/select option is selected in accordance with the present invention.
Figure 30:
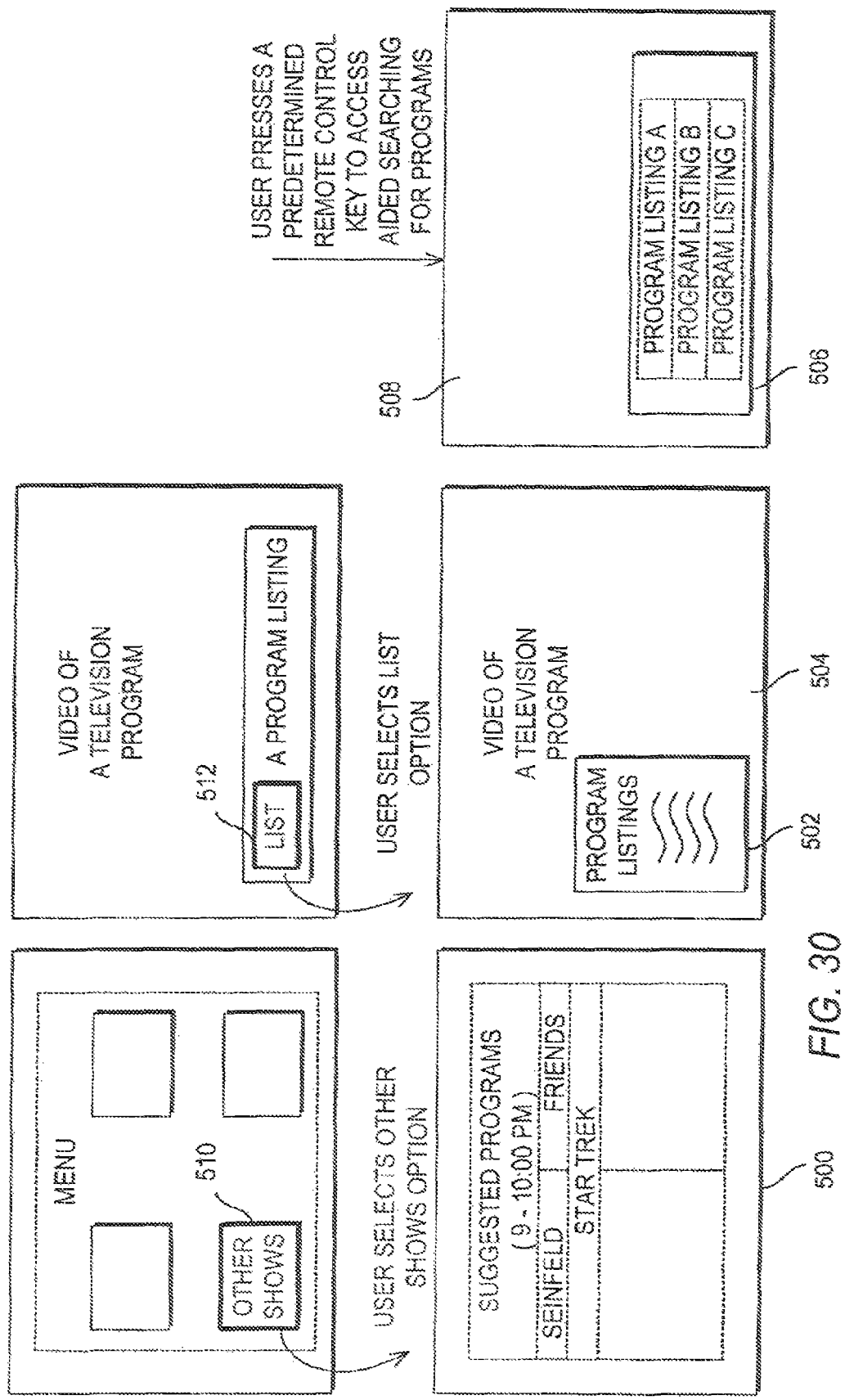
FIG. 30 is a diagram illustrating a grid display screen that is displayed when an Aother shows@ option is selected, a pop-up display region that is displayed when a list option is selected, and a grid display region.

As shown in FIG. 29, the program guide of the present invention may display illustrative adaptive flip criteria settings display screen 482 and illustrative adaptive flip criteria settings display screen 486. Adaptive flip criteria settings display screen 482 may include adjust neural network training option 484. Adjust neural network training option 484 may be selected by positioning a highlight window on adjust neural network training option 484 and pressing an OK key. In response, adaptive flip criteria settings display screen 486 may be displayed which includes adjustment option 488. Adjustment option 488 may include a list of programs viewed by a user and a rating associated with each program on the list. Each rating may be adjusted by the user to tune the performance of the trained neural network. Adaptive flip criteria setting display screen 486 may include add/select option 483 for adding a program as a training stimulus or selecting to ignore certain programming in training the neural network. When a user selects add/select option 483, adaptive flip criteria setting display screen 485 may be displayed. Display screen 485 may include add/select region 487 which provides the user with an opportunity to identify a program to be used in training the neural network or to select types of programs to ignore in training the neural network.

The program guide may allow a user to access a list of suggested programs. For example, as shown in FIG. 29, the program guide may display grid display screen 500, pop-up display region 502 on television screen 504, or grid display region 506 on television screen 508. Grid display screen 500, pop-up display region 502, and grid display region 506 may each include program listings for suggested programs determined as discussed above based on the attributes of user viewed programming (e.g., the current program, the last program viewed, programming in general that the user has recently viewed, or the program attributes of some other suitable set of programming). User access to grid display screen 500, pop-up display screen 502, and grid display region 506 may be provided by selecting an Aother shows@ option 510, by selecting a list option 512, or by pressing a predetermined remote control key.

The foregoing is merely illustrative of the principles of this invention and various modifications can be made by those skilled in the art without departing from the scope and spirit of the invention.

What is claimed is:

1. A method for recommending television programming to a user, comprising:
monitoring, using a processor within user television equipment, which television programming is being viewed by the user;
automatically identifying, using the processor, a currently viewed program based on the monitoring, wherein the currently viewed program has a plurality of program attributes each included within a respective attribute category;
determining that a user has selected an attribute category of actor as a criterion for recommending programs;
automatically identifying an actor who performs in the currently viewed program responsive to determining that the user has selected the attribute category of actor as a criterion for recommending programs; and
recommending using the processor, another program having an actor that matches the identified actor of the currently viewed program.

2. The method of claim 1, wherein automatically identifying a currently viewed program based on the monitoring comprises determining that the currently viewed program has been viewed by the user for a substantial portion of the program's length.

3. The method of claim 1 further comprising allowing the user to set a minimum viewing duration, wherein automatically identifying a currently viewed program based on the monitoring comprises determining that the currently viewed program has been viewed by the user for at least the minimum viewing duration.

4. The method of claim 1, further comprising determining whether the user has selected at least one attribute category of program title, program duration, program genre, program channel, scheduled program duration, program rating, and program content rating as a criterion for recommending programs.

5. The method of claim 1, wherein the user-selected attribute category is associated with a weight, and wherein recommending another program comprises identifying another program having one or more program attributes that best match the program attributes of the currently viewed program determined to be included within user-selected attribute category based on the weight.

6. The method of claim 5 further comprising allowing the user to assign the weight associated with the user-selected attribute category.

7. The method of claim 1, wherein recommending another program further comprises:
training a neural network using as training stimuli at least the program attributes of the currently viewed program determined to be included within the user-selected attribute category; and
applying program attributes associated with available programs to the trained neural network to recommend the other program.

8. The method of claim 7 further comprising:
determining a time of viewing associated with the currently viewed program; and
determining a length of viewing associated with the currently viewed program;
wherein the training stimuli includes the determined time of viewing and the determined length of viewing.

9. The method of claim 7 further comprising ignoring selected program types in training the neural network.

10. The method of claim 1, wherein recommending another program comprises building a list of program listings from a program listings database stored at the user television equipment.

11. The method of claim 1 further comprising:
receiving an indication from the user, using an input device at the user television equipment, to change channels from a current channel in a given direction; and
in response to the indication to change channels, tuning to an adjacent channel nearest the current channel in the given direction that is associated with the identified program using an adaptive flip feature.

12. The method of claim 1 further comprising displaying a program listing corresponding to the recommended program.

13. The method of claim 12 further comprising displaying the program listing in an overlay over the currently viewed program.

14. The method of claim 12 further comprising displaying the program listing in an overlay over the currently viewed program using an adaptive browse feature.

15. A system for recommending television programming to a user comprising user television equipment, wherein the user television equipment is configured to:
monitor which television programming is being viewed by the user;
automatically identify a currently viewed program based on the monitoring, wherein the currently viewed program has a plurality of program attributes each included within a respective attribute category;
determine that a user has selected an attribute category of actor as a criterion for recommending programs;
automatically identify an actor who performs in the currently viewed program responsive to determining that the user has selected the attribute category of actor as a criterion for recommending programs; and
recommend another program having an actor that matches the identified actor of the currently viewed program.

16. The system of claim 15, wherein the user television equipment is further configured to determine that the currently viewed program has been viewed by the user for a substantial portion of the program's length.

17. The system of claim 15, wherein the user television equipment is further configured to:
allow the user to set a minimum viewing duration, and
determine that the currently viewed program has been viewed by the user for the minimum viewing duration.

18. The system of claim 15, wherein the user television equipment is further configured to determine whether the user has selected at least one attribute category of program title, program duration, program genre, program channel, scheduled program duration, program rating, and program content rating as a criterion for recommending programs.

19. The system of claim 15, wherein the user-selected attribute category is associated with a weight, and wherein the user television equipment is further configured to recommend another program having one or more program attributes that best match the program attributes of the currently viewed program determined to be included within the user-selected attribute category based on the weight.

20. The system of claim 19, wherein the user television equipment is further configured to allow the user to assign the weight associated with the user-selected attribute category.

21. The system of claim 15, wherein the user television equipment is further configured to:
train a neural network using as training stimuli at least the program attributes of the currently viewed program determined to be included within the user-selected attribute category; and
apply program attributes associated with available programs to the trained neural network to recommend the other program.

22. The system of claim 21, wherein the user television equipment is further configured to:
determine a time of viewing associated with the currently viewed program; and
determine a length of viewing associated with the currently viewed;
wherein the training stimuli includes the determined time of viewing and the determined length of viewing.

23. The system of claim 21, wherein the user television equipment is further configured to ignore selected program types in training the neural network.

24. The system of claim 15, wherein the user television equipment is further configured to recommend another program by building a list of program listings from a program listings database stored at the user television equipment.

25. The system of claim 15, wherein the user television equipment is further configured to:
receive an indication from the user to change channels from a current channel in a given direction; and
in response to the indication to change channels, tune to an adjacent channel nearest the current channel in the given direction that is associated with the identified program using an adaptive flip feature.

26. The system of claim 15, wherein the user television equipment is further configured to display a program listing corresponding to the recommended program.

27. The system of claim 26, wherein the user television equipment is further configured to display the program listing in an overlay over the currently viewed program.

28. The system of claim 26, wherein the user television equipment is further configured to display the program listing in an overlay over the currently viewed program using an adaptive browse feature.

* * * * *